(12) United States Patent
Carminati et al.

(10) Patent No.: US 12,422,536 B2
(45) Date of Patent: Sep. 23, 2025

(54) METHOD OF OPERATING ELECTRO-ACOUSTIC TRANSDUCERS, CORRESPONDING CIRCUIT AND DEVICE

(71) Applicant: STMICROELECTRONICS S.r.l., Agrate Brianza (IT)

(72) Inventors: Francesca Carminati, Agrate Brianza (IT); Marco Passoni, Cornate d'Adda (IT); Beatrice Rossi, Milan (IT); Diego Carrera, Lodi (IT); Pasqualina Fragneto, Burago di Molgora (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 332 days.

(21) Appl. No.: 18/150,534

(22) Filed: Jan. 5, 2023

(65) Prior Publication Data

US 2023/0221422 A1    Jul. 13, 2023

(30) Foreign Application Priority Data

Jan. 13, 2022    (IT) .......................... 102022000000464

(51) Int. Cl.
*G01S 7/526*    (2006.01)
*G01S 15/06*    (2006.01)
(Continued)

(52) U.S. Cl.
CPC .............. *G01S 7/526* (2013.01); *G01S 15/06* (2013.01); *H04R 3/04* (2013.01); *H04R 17/10* (2013.01);
(Continued)

(58) Field of Classification Search
CPC .......... G01S 7/526; G01S 15/06; G01S 7/524; G01S 7/5276; G01S 7/53; G01S 15/101;
(Continued)

(56) References Cited

U.S. PATENT DOCUMENTS 5,267,219 A    11/1993    Woodward
5,335,545 A    8/1994    Leszczynski
(Continued)

FOREIGN PATENT DOCUMENTS

EP    3103191 B1    7/2018

OTHER PUBLICATIONS

Massimino et al. ("On the effects of package on the PMUTs performances—Multiphysics model and frequency analyses." Micromachines 11.3 (2020)) (Year: 2020).*
(Continued)

*Primary Examiner* — Yuqing Xiao
*Assistant Examiner* — Christopher Richard Walker
(74) *Attorney, Agent, or Firm* — SEED INTELLECTUAL PROPERTY LAW GROUP LLP

(57) ABSTRACT

A method of operating a PMUT electro-acoustical transducer, the method comprising: applying over an excitation interval to the transducer an excitation signal which is configured to emit corresponding ultrasound pulses towards a surrounding space, acquiring at a receiver reflected ultrasound pulses as reflected in said surrounding space, generating a reference echo signal, performing a cross-correlation of said acquired received ultrasound pulses with said reference echo signal, performing a measurement based on the cross-correlation results, in particular a measurement of the time of flight of the ultrasound pulses, wherein said reference echo is obtained by finding an oscillation frequency of the transmitter on the basis of a transmitter ringdown signal, finding an oscillation frequency of the receiver on the basis of a receiver ringdown signal, performing a frequency tuning respectively on the transmitter and the receiver on the basis of said respective oscillation frequencies, then sweeping an input frequency of the transmitter to find a frequency of the maximum displacement in the ringdown signal, (Continued)

performing a frequency tuning of the receiver at said frequency of the maximum displacement in the ringdown signal of the transmitter.

18 Claims, 14 Drawing Sheets

(51) Int. Cl.
*H04R 3/04* (2006.01)
*H04R 17/10* (2006.01)
*H04R 29/00* (2006.01)

(52) U.S. Cl.
CPC ..... *H04R 29/001* (2013.01); *H04R 2201/003* (2013.01)

(58) Field of Classification Search
CPC ..... G01S 7/521; B06B 1/0644; B06B 1/0207; H04R 3/04; H04R 17/10; H04R 2201/003; H04R 29/001
See application file for complete search history.

(56) References Cited

U.S. PATENT DOCUMENTS

| | | | |
|---|---|---|---|
| 7,004,031 | B2 | 2/2006 | Oda et al. |
| 7,006,641 | B1 | 2/2006 | Saiki et al. |
| 10,768,706 | B1 | 9/2020 | Wang et al. |
| 2003/0039173 | A1 | 2/2003 | Yurchenko et al. |
| 2010/0011471 | A1 | 1/2010 | Jesse et al. |
| 2013/0181573 | A1 | 7/2013 | Hines et al. |
| 2016/0380640 | A1 | 12/2016 | Boser et al. |
| 2017/0074977 | A1 | 3/2017 | Koudar et al. |
| 2017/0115382 | A1 | 4/2017 | Koudar et al. |
| 2017/0168151 | A1 | 6/2017 | Kim |
| 2019/0033434 | A1 | 1/2019 | Ding et al. |
| 2020/0292684 | A1* | 9/2020 | Passoni ............... G01S 7/52004 |

OTHER PUBLICATIONS

Zúñiga ("Analytical solution of the damped Helmholtz-Duffing equation." Applied Mathematics Letters 25.12 (2012): 2349-2353.) (Year: 2012).*

Kusano et al. ("Effects of DC bias tuning on air-coupled PZT piezoelectric micromachined ultrasonic transducers." journal of microelectromechanical systems 27.2 (2018): 296-304.) (Year: 2018).*
Zengerle et al. ("Using the nonlinear Duffing effect of piezoelectric micro-oscillators for wide-range pressure sensing." Actuators. vol. 10. No. 8. MDPI, 2021.) (Year: 2021).*
Defoort et al. ("Chaotic ultrasound generation using a nonlinear piezoelectric microtransducer." Journal of Micromechanics and Microengineering 31.5 (2021): 054002.) (Year: 2021).*
Tajaddodianfar et al. ("Nonlinear dynamics of MEMS/NEMS resonators: analytical solution by the homotopy analysis method." Microsystem Technologies 23 (2017): 1913-1926.) (Year: 2017).*
Hong et al., "Vibration of Micromachined Circular Piezoelectric Diaphragms," *IEEE Transactions on Ultrasonics, Ferroelectrics, and Frequency Control* 53(4):697-706, Apr. 2006.
Kumar et al., "Significant Enhancement in Operational Bandwidth of ZnO PMUTs due to the Simultaneous Existence of Softening and Hardening Nonlinearity," *2020 IEEE International Ultrasonics Symposium (IUS)*, Las Vegas, NV, USA, Sep. 11-20, 2020, pp. 1-4.
Kusano et al., "Effects of DC Bias Tuning on Air-Coupled PZT Piezoelectric Micromachined Ultrasonic Transducers," *Journal of Microelectromechanical Systems*, pp. 1-9, 2018.
Luo et al., "Airborne Piezoelectric Micromachined Ultrasonic Transducers for Long-Range Detection," *Journal of Microelectromechanical Systems* 30(1):81-89, Feb. 2021.
Luo et al., "High-Pressure Output 40 kHz Air-Coupled Piezoelectric Micromachined Ultrasonic Transducers," *MEMS 2019*, Seoul, KOREA, Jan. 27-31, 2019, pp. 787-790.
Massimino et al., "Air-Coupled Array of Pmuts at 100 kHz with PZT Active Layer: Multiphysics Model and Experiments," *2019 20th International Conference on Thermal, Mechanical and Multi-Physics Simulation and Experiments in Microelectronics and Microsystems (EuroSimE)*, Hannover, Germany, Mar. 24-27, 2019. (5 pages).
Przybyla et al., "3D Ultrasonic Gesture Recognition," IEEE International Solid-State Circuits Conference, Session 12, Sensors, MEMS, and Displays, 12.1, Feb. 11, 2014, 3 pages.
Przybyla et al., "In-Air Rangefinding With an AlN Piezoelectric Micromachined Ultrasound Transducer," *IEEE Sensors Journal* 11(11):2690-2697, Nov. 2011.
Svilainis et al., "Optimization of the Ultrasonic Excitation Stage," Proceedings of the ITI 2008 30th International Conference on Information Technology Interfaces, Jun. 23-26, 2008, Cavtat, Croatia, pp. 791-796.

* cited by examiner

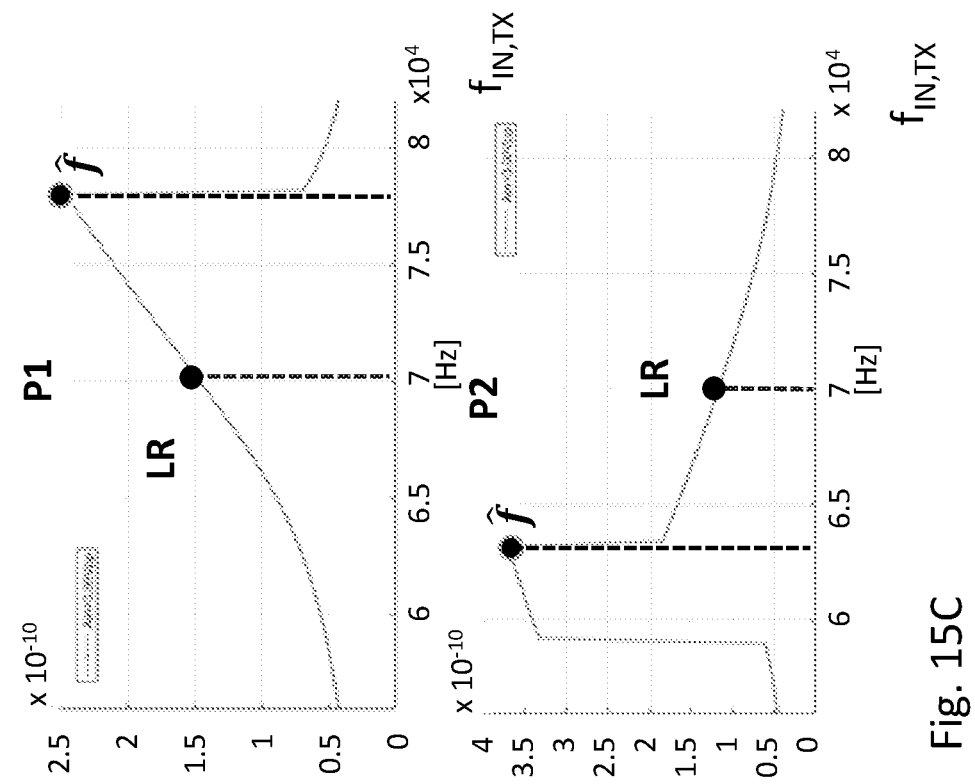
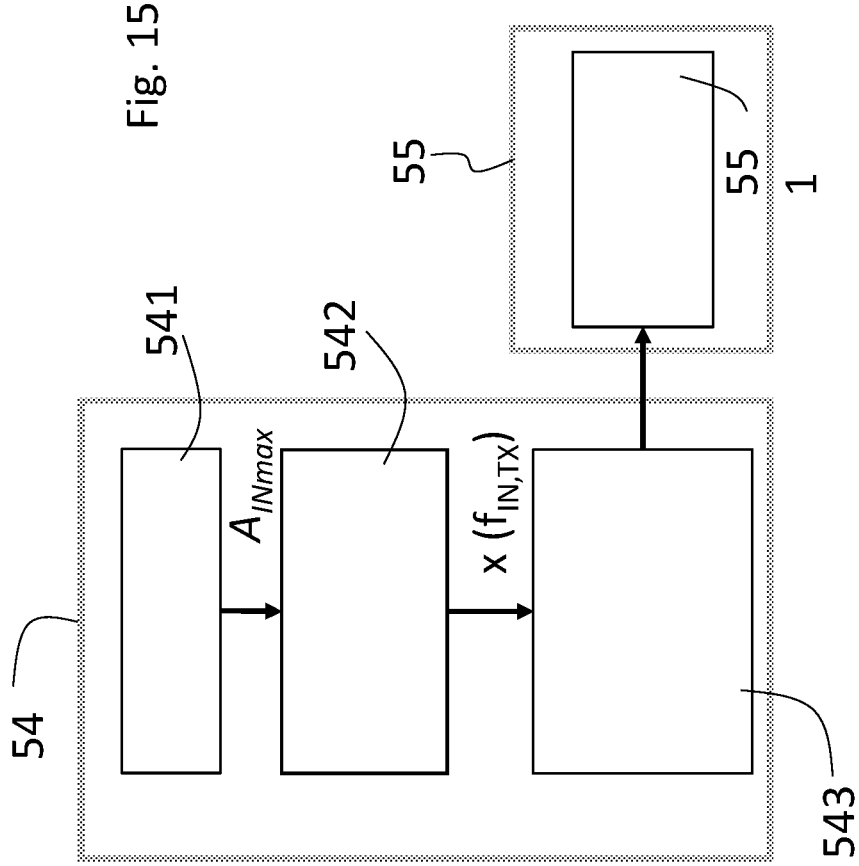
Fig. 15A
Fig. 15B
Fig. 15C

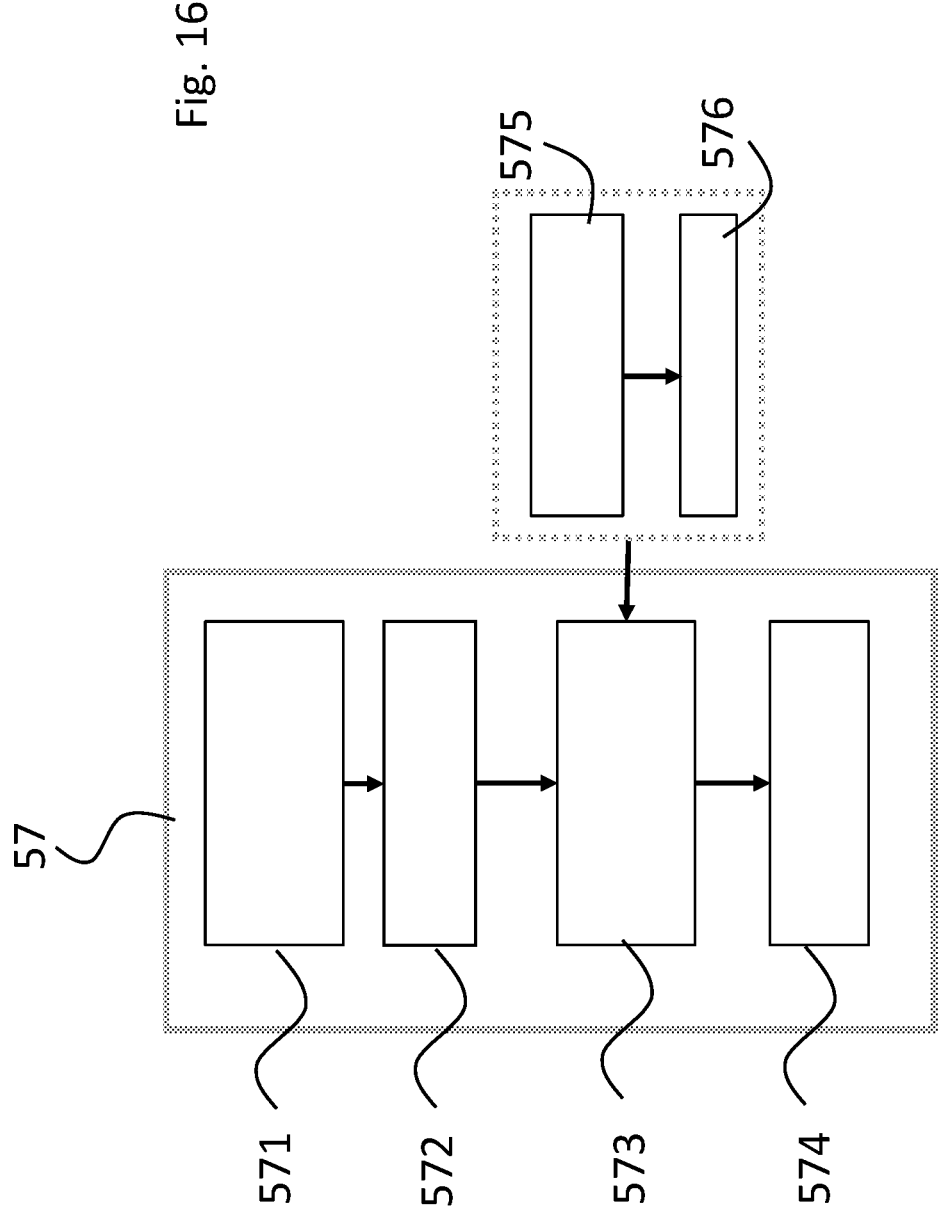

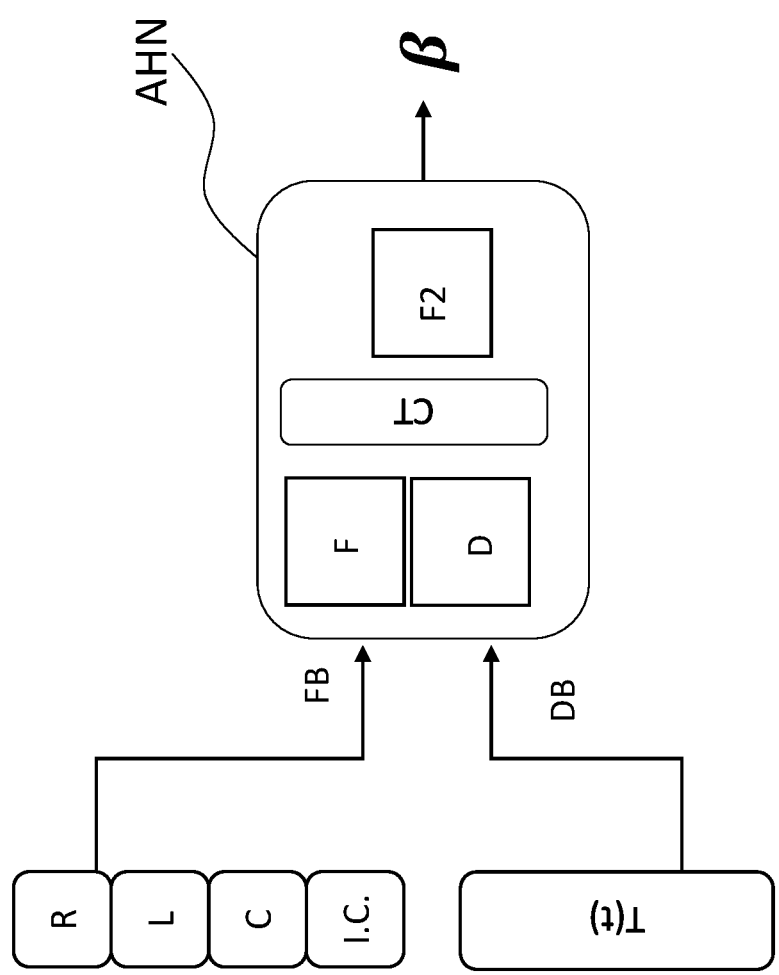

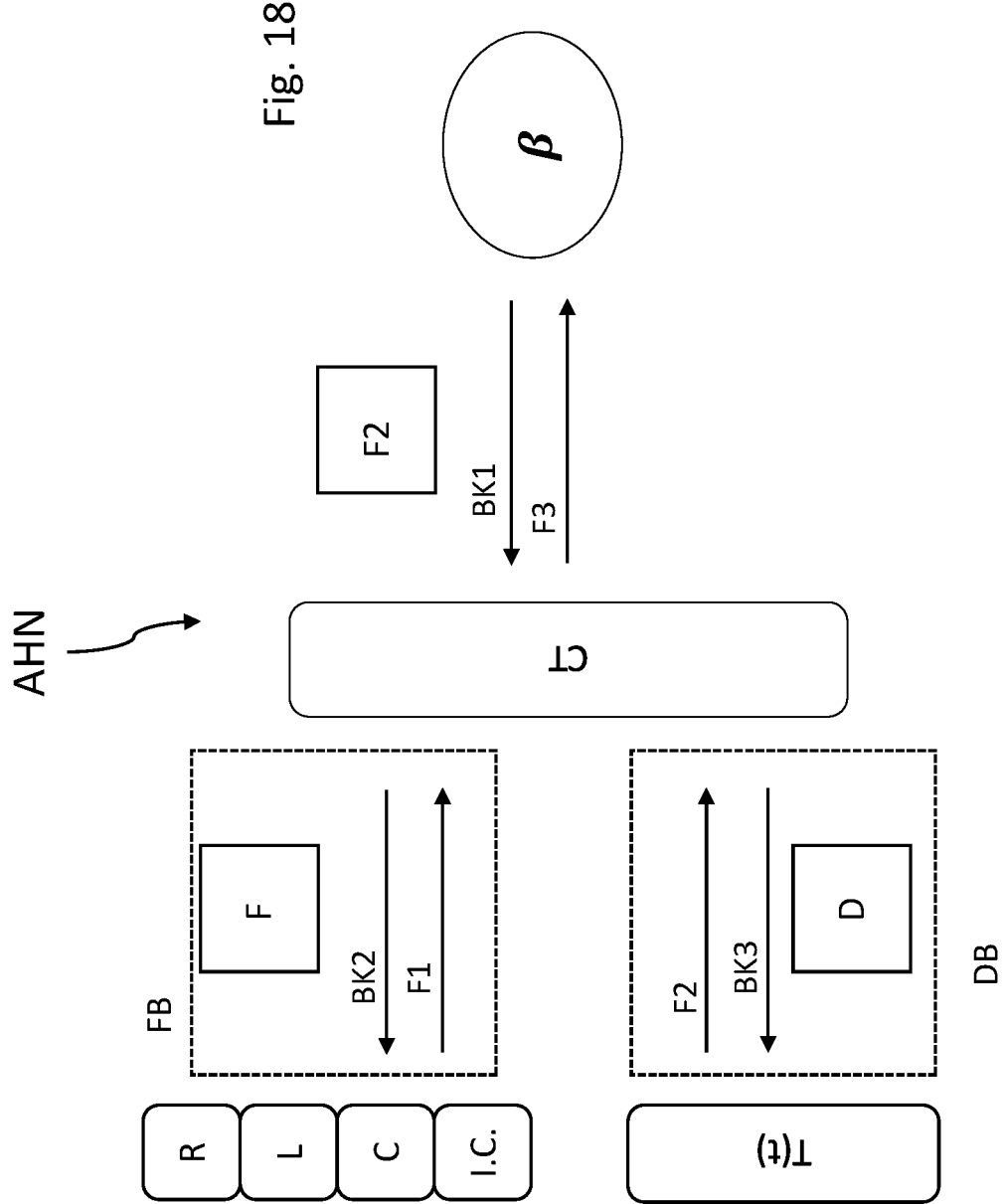

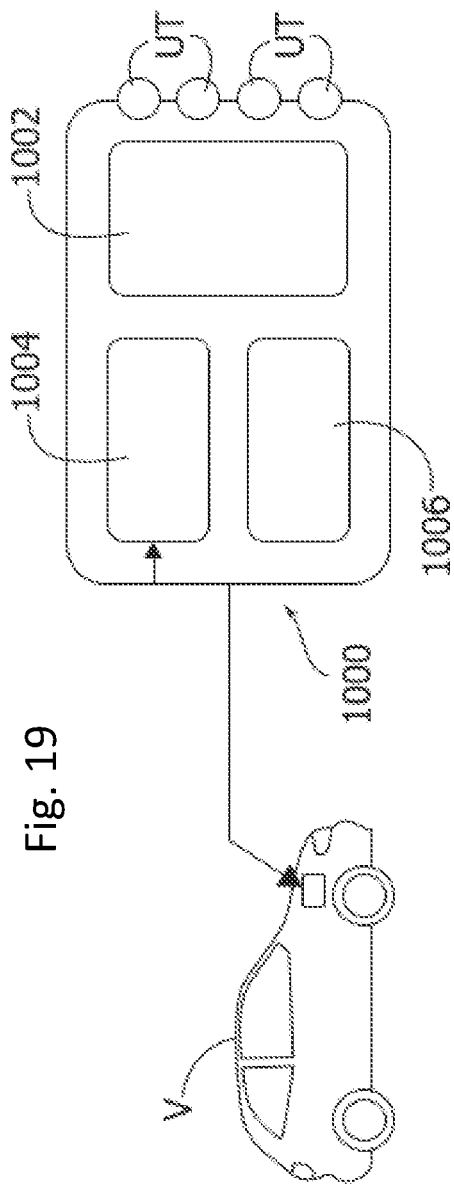

METHOD OF OPERATING ELECTRO-ACOUSTIC TRANSDUCERS, CORRESPONDING CIRCUIT AND DEVICE

BACKGROUND

Technical Field

The description relates to techniques involving the use of electro-acoustic transducers, that is components capable of converting electrical signals into acoustic signals and/or converting acoustic signals into electrical signals. The description relates in particular to Piezoelectric Micromachined Ultrasonic Transducers (PMUT).

Description of the Related Art

Ultrasonic transducers can be considered for use in various applications such as acoustic location methods, wherein (ultra)sound waves can be used to determine the distance and/or the direction of a source or reflector.

Techniques based on the Doppler effect and/or measuring the time-of-flight (TOF) of sound waves are exemplary of other areas where such transducers can be used.

Obstacle detection (mono-, bi-, three-dimensional), volume measurement, gesture recognition and (Doppler-based) flow metering and are exemplary of possible fields of application.

Ultrasonic transducers currently referred to as PMUTs (Piezoelectric Micromachined Ultrasonic Transducers) are MEMS-based piezoelectric transducers (where MEMS is an acronym for Micro Electro-Mechanical Systems) that, unlike bulk piezoelectric transducers which rely on thickness-mode motion, take advantage of the flexural motion of a thin membrane coupled with a thin piezoelectric film.

In FIG. 1A to this regard it is shown an example of PMUT transducer comprising a membrane 1010 coupled with a thin piezoelectric film 1020. The upper portion of FIG. 1A shows the deflection upwards of the membrane 1010 and piezoelectric film 1020 when a positive voltage is applied between a top electrode 1030 and a metallic layer 1050 forming the bottom electrode coupled to the bottom surface of the piezoelectric film 1020 and to ground. The lower portion of FIG. 1A shows the deflection downwards of the membrane 1010 and piezoelectric film 1020 when a negative voltage is applied. In the following, when referring in particular to the mechanical properties of the membrane 1010, in particular the stiffness, the mechanical system represented by the membrane 1010 and film 1020 is intended. In particular, all the lumped parameters described in the following are referred to the fundamental mode, therefore they are modal parameters (stiffness, $\tau$ and RLC branch in FIG. 5). The other normal modes may be not considered under the assumption that they are not excited when working at frequencies close to the natural frequency of the fundamental mode.

The functional diagram of FIG. 1B refers by way of example to ultrasound-based obstacle detection and ranging which may include an electrical transmission signal TX applied to a transmission pulse generator 10 (a PMUT-based generator for instance) which is configured to emit corresponding acoustical pulses (ultrasound pulses) towards a surrounding space, for instance as input voltage $V_{IN,TX}$, with a given input frequency $f_{IN}$.

Sound as reflected (by an "obstacle," for instance, not visible in the Figure) in such surrounding space can be acquired at a receiver 20 so that, after possible envelope extraction (an optional operation exemplified by a dashed block 30 in FIG. 1) cross-correlation can be performed in a block 40 with a reference signal such as a reference echo RE. Such a reference signal can be generated (as discussed in the following) in an operation represented by block 50 with envelope extraction possibly applied (as represented at 60 in dashed line) to the reference echo RE.

As exemplified in FIG. 1B, the outcome of cross-correlation of the received signal and the reference signal RE at block 40 may produce a measurement signal MS to be used for a desired application (obstacle detection and ranging, for instance). For instance the measurement signal MS resulting from cross-correlation shows as a function of time a cross-correlation peak or peaks, which may correspond to obstacles reflecting the ultrasound pulses at different position. The time coordinate of the peak indicates the time-of-flight of the pulses, from which it can be obtained the distance, knowing the speed of the acoustic pulses.

A possible time behavior of such a reference signal RE is exemplified on the right-hand side of FIG. 1B.

Also, as discussed previously, a possible TX/RX obstacle detection/ranging arrangement is just exemplary of a wide variety of possible applications (volume measurement, gesture recognition, flow metering, just to mention a few), which may possibly include a "transmitter" section and/or a "receiver" section.

In US 2020292684 A1, a method for measuring airborne Time-of-Flight with PMUTs is disclosed, based on real-time Reference Echo Synthesis and Frequency Tuning. This method addresses some technical problems related to this type of transducers, such as low mechanical damping, manufacturing tolerances, giving different mechanical response (e.g., resonance frequency) for each sample, low transmitted power, time-variation (wandering) of mechanical parameters.

Such Reference Echo Synthesis is based on a linear model and shows limitations related to non-linear mechanical response, in the first place a limited range, caused by saturation of sound pressure level, when increasing the driving voltage. Also, it has a reduced accuracy, caused by applying a linear model to a non-linear system.

The major cause of this type of non-linearity is recognized in the field in that the membrane stiffness is not constant, but it is a function of displacement. In particular, if there is no pre-stress, the more the membrane moves away from the equilibrium position, the more the stiffness increases (hardening spring).

A non-linear response is typical of this type of transducers, because the radius to thickness ratio of the membrane is quite high.

BRIEF SUMMARY

Various embodiments disclosed herein contribute to further improving operation of electro-acoustic transducers by addressing certain issues such as a limited range, caused by saturation of sound pressure level, when increasing the driving voltage and reduced accuracy, caused by applying a linear model to a non-linear system.

According to one or more embodiments, a method of operating a PMUT electro-acoustical transducer includes applying over an excitation interval to the transducer an excitation signal which is configured to emit corresponding ultrasound pulses towards a surrounding space, acquiring at a receiver reflected ultrasound pulses as reflected in said surrounding space, generating a reference echo signal, performing a cross-correlation of said acquired received ultrasound pulses with said reference echo signal, performing a measurement based on the cross-correlation results, in particular a measurement of the time of flight of the ultrasound pulses, wherein said reference echo is obtained by finding an oscillation frequency of the transmitter on the basis of a transmitter ringdown signal, finding an oscillation frequency of the receiver on the basis of a receiver ringdown signal, performing a frequency tuning respectively on the transmitter and the receiver on the basis of said respective oscillation frequencies, then sweeping an input frequency of the transmitter to find a frequency of the maximum displacement in the ringdown signal, performing a frequency tuning of the receiver at said frequency of the maximum displacement in the ringdown signal of the transmitter.

One or more embodiments may relate to a corresponding device (an acoustic location sensor module being exemplary of such a device).

One or more embodiments may relate to a corresponding system.

Obstacle detection systems (for use in the automotive field, for instance), volume measurement systems, gesture recognition systems or flow metering systems are exemplary of such systems.

BRIEF DESCRIPTION OF THE SEVERAL VIEWS OF THE DRAWINGS

One or more embodiments will now be described, by way of example, with reference to the annexed figures wherein:

FIGS. 15A, 15B, 15C are exemplary of a third operation of the method according to embodiments FIG. 16 is exemplary of a fourth operation of the method according to embodiments, FIGS. 17 and 18 are exemplary of a procedure in the operation of FIG. 15A according to embodiments, FIG. 19 is exemplary of a system operable according to embodiments.

DETAILED DESCRIPTION

Figure 12:
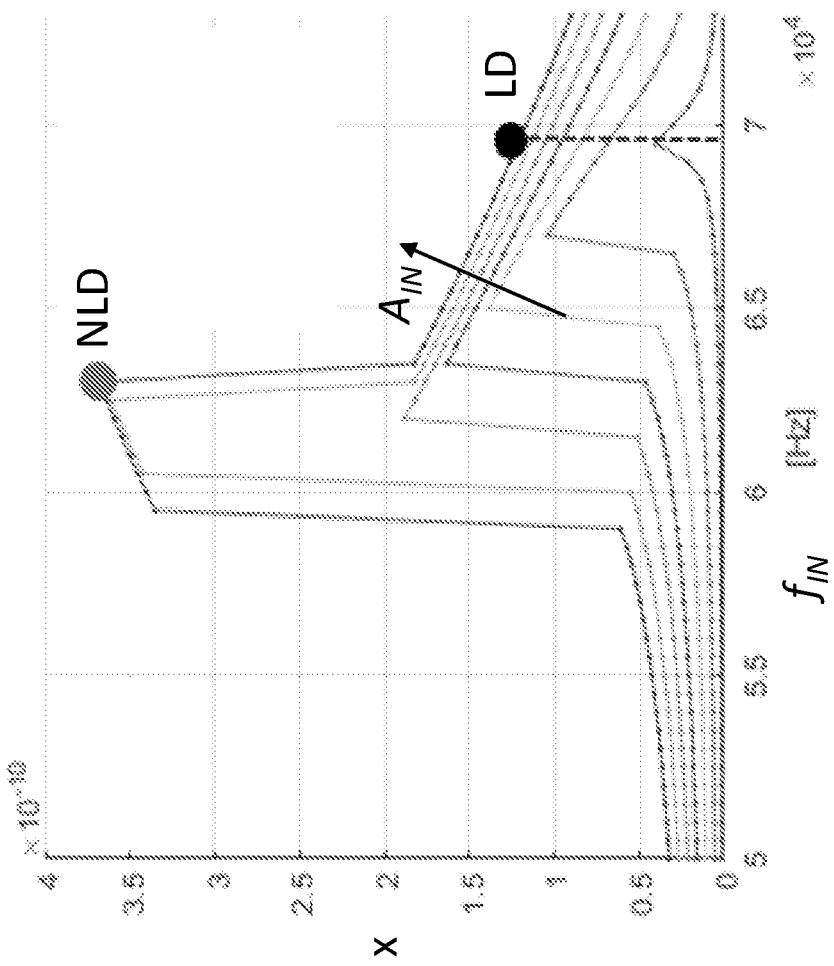
FIG. 12 is a further diagram exemplary of possible behavior of an electro-acoustical transducer, according to embodiments.

In the ensuing description, one or more specific details are illustrated, to provide an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

It will be otherwise appreciated that one or more embodiments apply to electro-acoustic transducers, that is components capable of acting as transducers between the electrical domain and the acoustical domain, by converting electrical signals into acoustic signals—and/or—converting acoustic signals into electrical signals; that is, the wording "electro-acoustic" is in no way to be construed, even indirectly, as limited to converting electrical signals into acoustic signals.

Also, the exemplary description provided in the following will refer for simplicity and ease of understanding to arrangements comprising both a "transmitter" section (TX), configured to convert electrical signals into acoustic signals transmitted (towards an obstacle, for instance), and a "receiver" section (RX), configured to convert acoustical signals received (as reflected from an obstacle, for instance) into electrical signals.

However, the embodiments are not limited to such possible TX/RX arrangements and can be advantageously applied to arrangements including a "transmitter" section (to controllably adjust the resonance frequency of a transducer therein, for instance) without a "receiver" section (to generate a reference signal for cross-correlation with a signal received via a transducer therein, for instance), or a "receiver" section without an "transmitter" section.

Likewise, while the exemplary description provided in the following will refer for simplicity and ease of understanding to ultrasound transducers, one or more embodiments may apply, in general, to electro-acoustic transducers capable of acting as transducers between the electrical domain and the acoustical domain. In that respect, while PMUTs will be referred throughout for simplicity and ease of understanding, the embodiments can be advantageously applied to electro-acoustic transducers other than PMUTs where issues such as those discussed in the foregoing may arise.

Finally, while one or more embodiments may contemplate using distinct transducers for transmission (TX) and reception (RX), certain embodiments may contemplate a single transducer configured to operate both as a transmitter and a receiver (TX/RX).

Figure 2:
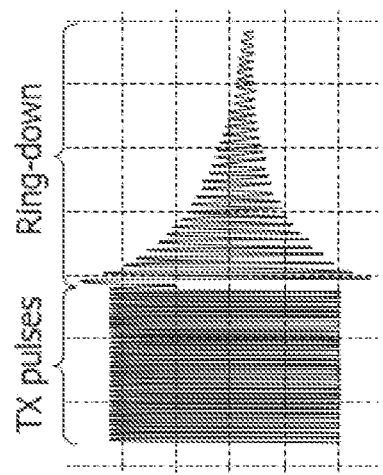
FIGS. 2, 3 and 4 are schematically exemplary of criteria which may be adopted in embodiments in order to identify certain parameters of an electro-acoustical transducer.

One or more embodiments may be based on the recognition that the resonance frequency of a transducer as considered herein (and other parameters, such as parameters exemplary of the damping behavior of the vibrating part of the transducer, such as the membrane of a PMUT, for instance) can be identified as schematically exemplified in FIG. 2, namely by sensing the transducer response to (electrical) stimulation pulses (see TX pulses on the left-hand side of FIG. 2).

The damping ratio, the decay time constant or the Q-factor are exemplary of such "damping parameters" representative of the damping behavior of a transducer.

FIG. 2 is exemplary of the operation of sensing the ring-down behavior of a transducer (namely how the pulses gradually "die-down" once the stimulation pulses are discontinued), as indicated on the right-hand side of FIG. 2.

As exemplified in FIG. 2, from the ring-down signal sensed on the transducer (transmitter and/or receiver)—which can be acquired as discussed in the following—(at least) two values can be extracted, namely the (free) oscillation frequency $f_0$ and (as a parameter exemplary of the damping behavior of the transducer) the decay time constant $\tau$.

Figure 3:
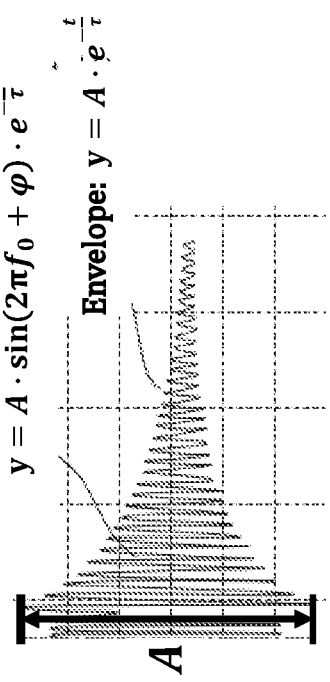

Indeed, based on general principles of physics applying to an oscillatory (vibratory) system, applying to such an electro-acoustical transducer a train of (electrical) excitation pulses (TX pulses) over an excitation interval gives rise—once excitation is discontinued, that is after the end of the excitation interval—to a ring-down behavior so that an (electrical) ring-down signal (Ring-down) can be acquired at the transducer which can be expressed as a function of time t as:

$$y = A^* \sin(2\pi f_0 + \varphi) e^{-t/\tau}$$

with an envelope which can be expressed as $$y = A^* e^{-t/\tau}$$

where A is the amplitude at the beginning of ringdown, which can be extracted from the acquired ringdown waveform as shown in FIG. 3. $f_0$ and $\tau$ are the resonance frequency and the decay time constant of the system and $\varphi$ an arbitrary phase.

While the decay time constant $\tau$ will be hereinafter referred to for simplicity, those of skill in the art will easily appreciate that the embodiments are in no way limited to the choice of any specific damping parameter.

As noted, other than the decay time constant $\tau$, the damping ratio or the Q-factor (or any other parameter associated/derivable from these) representative of how the amplitude of the oscillation reduces over time during ringdown, eventually going to zero, can be used in embodiments.

Figure 4:
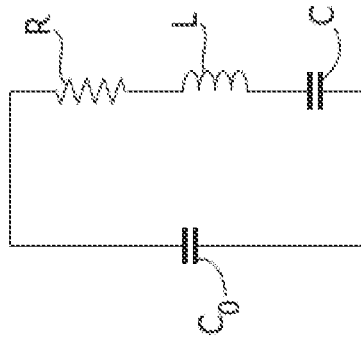

FIG. 4 is exemplary of the possibility of providing an "electrical" representation of an oscillating system As discussed in the following such an electrical representation may take the form of a BVD model (Butterworth-Van Dyke model), i.e., a capacitor $C_0$ arranged in parallel with a RLC branch comprising the series of a resistor R, an inductor L and another capacitor C, to which the following relationships may apply:

$$f_0 = (1/2\pi)(L/[C_0 C/(C_0 + C)])^{1/2}$$

$$\tau = 2(L/R)$$

$$R = VIN/IRLC$$

$V_{IN}$ indicating the amplitude of driving voltage, which is known. $I_{RLC}$ indicates the current in RLC (series) branch at the beginning of ringdown. It can be computed from amplitude A, by circuit equations which depends on the specific implementation of the analog front-end (e.g., amplifier gains, filters), but which derivation, i.e., to compute $I_{RLC}$ from A, is clearly within the ability of the person skilled in the art.

Having three equations and four unknowns, namely the BVD model parameters L, R, C, $C_0$, such a system does not admit a univocal solution. However, in the present context (PMUTs, for instance), the assumption can be made that parallel capacitance $C_0$ is much larger than the series capacitance C (so that a constant value can be used for $C_0$) One of the unknowns can thus be removed and the system solved.

Figure 5:
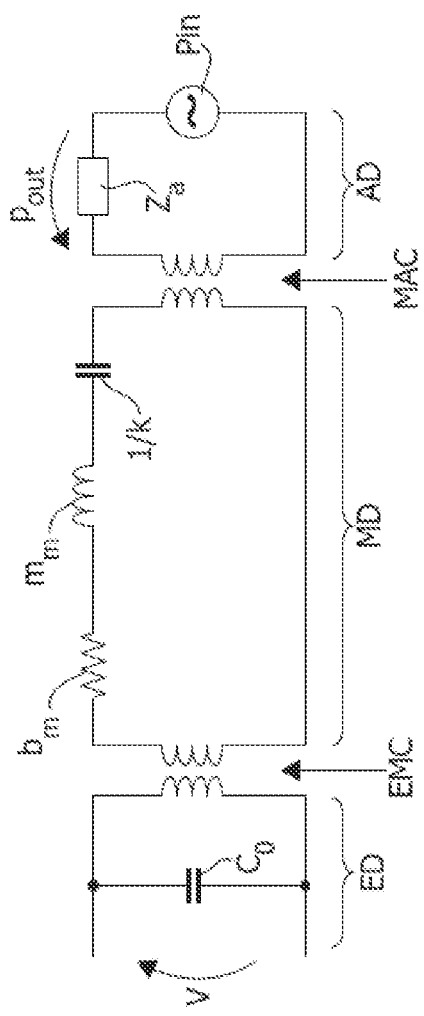
FIGS. 5, 6A and 6B are illustrative of a model applicable in embodiments.

Just by way of background, the Butterworth-Van Dyke model (also known as a "Mason" or "KLM" model) is an electrical equivalent circuit of an electro-acoustical transducer comprising, as schematically represented in FIG. 5, an electrical domain ED coupled, via an electrical-mechanical coupling EMC, a mechanical domain MD (notionally having plural normal modes: the first one is represented in FIG. 5 for simplicity). The mechanical domain MD is in turn coupled, via a mechanical-acoustic coupling MAC, to an acoustic domain AD.

Being an electrical equivalent circuit, the electrical domain ED can be represented as a capacitor $C_0$ across a first (primary, for instance) winding of a first transformer modeling the electrical-mechanical coupling EMC, with an (electrical) signal V applied across the capacitor $C_0$ and the winding of the transformer. Those familiar with the BVD model will appreciate that V may be a generator (that is, an input, as may be the case of ES in FIG. 6A) or a measuring unit (that is, an output as may be the case of SM in FIG. 6B).

As represented in FIG. 5, the mechanical domain MD comprises the other (secondary, for instance) winding of the transformer which models the electrical-mechanical coupling EMC and a first (primary, for instance) winding of a (second) transformer modeling the mechanical-acoustic coupling MAC coupled in a loop including the series connection of a resistor $b_m$ modeling internal losses, an inductor $m_m$ modeling the (vibrating) mass (a membrane, for instance) and a capacitor modeling the stiffness 1/k thereof.

As represented in FIG. 5, the acoustic domain AD comprises the other (secondary, for instance) winding of the transformer which models the electrical-mechanical coupling EMC included in a loop together with a generator which models the sound pressure level $p_{in}$ possibly incident onto the transducer and an impedance $Z_a$ which models the (air) acoustic impedance.

Figure 6A:
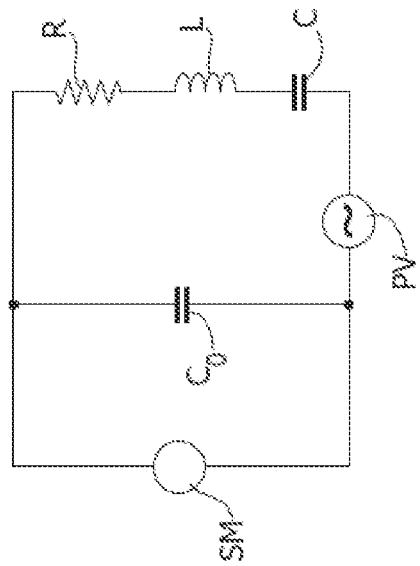
Figure 6B:
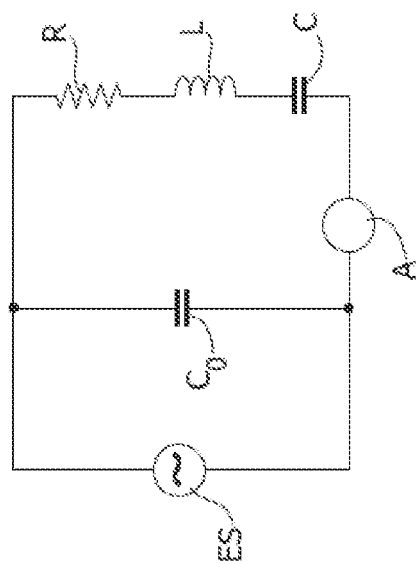

It is noted that considering the impedance at the input port, the model can be simplified by removing the transformers EMC, MAC, which results in simplified models for a transmitter transducer (electric to acoustic) and for a receiver transducer (acoustic to electric) as represented in FIG. 6A and FIG. 6B, respectively, where parts or elements like parts or elements already discussed in connections with the previous figures are indicated by like reference symbols.

In the transmitter model of FIG. 6A, ES represents an (electrical) excitation signal (TX in FIG. 1, for instance) applied to a transmitter transducer (10 in FIG. 1, for instance) which results in a current A indicative of (proportional to) the (ultra)sound pressure level generated by the transducer.

In the receiver model of FIG. 6B, PV represents a voltage indicative of (proportional to) the incident (ultra)sound pressure level (as received at 20 in FIG. 1, for instance) and SM denotes a measured (voltage) signal.

In one or more embodiments, the ability of identifying the resonance frequency of an electro-acoustical transducer may be exploited in order to obtain that a certain transducer may operate at a desired resonance frequency.

As discussed previously, a transducer membrane possibly having different and time-varying resonance frequencies, for instance at a transmitter (block 10 in FIG. 1) and at a receiver (block 20 in FIG. 1) may adversely affect operation of a related arrangement, by possibly making is unsatisfactory, if not hardly possible.

Figure 7:
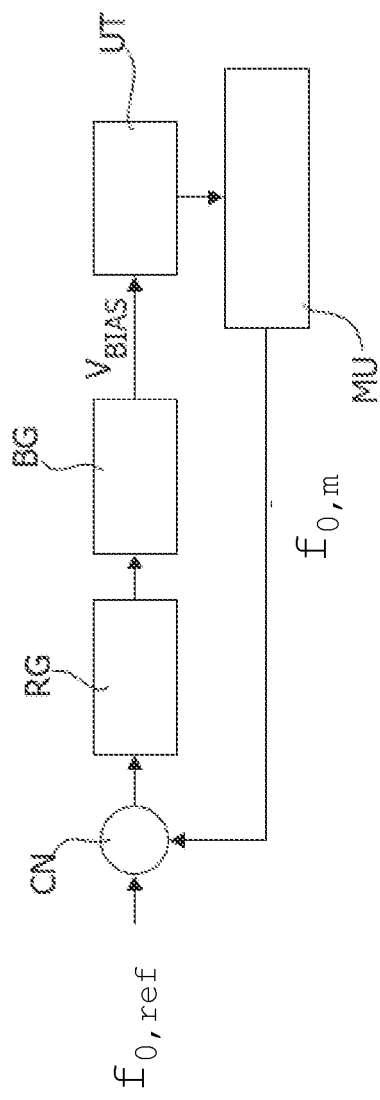
FIGS. 7, 8A and 8B are illustrative of possible exploitation of such a model in embodiments.

In one or more embodiments, the ability to identify the resonance frequency of an electro-acoustical transducer may be exploited as schematically exemplified in FIG. 7, that is by exploiting the dependency of a piezo-electric layer stiffness (and thus the resonant behavior of the associate transducer) on a (DC) bias voltage $V_{BIAS}$ applied to the transducer UT.

In one or more embodiments as exemplified in FIG. 7 this may occur via a bias generator BG controlled by a regulator RG configured to selectively vary the resonance frequency of the transducer UT as a function of the offset (difference) calculated at a comparison node CN between a setpoint oscillation frequency $f_{0,ref}$ (corresponding to a desired resonance frequency, for instance) and an actual resonance frequency $f_{0,m}$ as measured on the transducer UT via a measurement unit MU.

As exemplified herein, the measurement unit MU can be configured to measure the actual resonance frequency $f_{0,m}$ with a view to bringing the resonance frequency of the electro-acoustical transducer (UT) to a reference frequency value (for instance as discussed in connection with FIG. 7, for instance, that is by controlling a bias voltage $V_{BIAS}$ of the electro-acoustical transducer as a function of the resonance frequency).

This may occur irrespective of the possible use of a BVD model (e.g., to synthesize a reference echo RE).

For instance, the measurement unit MU can be configured to perform a fitting of the function $y=A*\sin(2\pi f_0+\varphi)e^{-t/\tau}$ on the data measured as exemplified in FIG. 3.

A (closed loop) control system as exemplified in FIG. 7 may thus be configured to operate, in order to facilitate having $f_{0,m}=f_{0,ref}$ so that the transducer UT may operate at a desired resonance frequency.

A (closed loop) control system as exemplified in FIG. 7 is the representation of the control with transfer functions assigned to each block (continuous or discrete time). Some of these blocks may not be not physical, but may be software computations (e.g., CN, RG, part of MU), while the bias generator BG and the transducer UT are usually physical blocks.

Figure 1A:
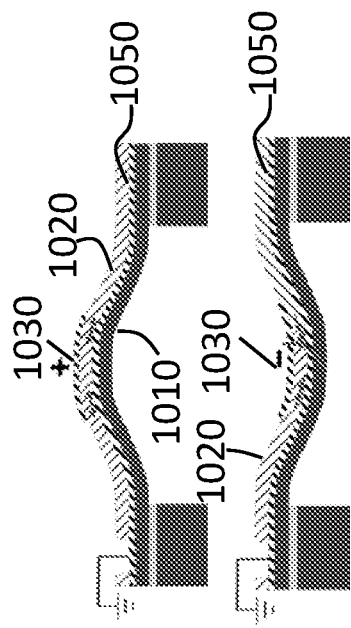
FIG. 1A is an example of a PMUT transducer comprising a membrane coupled with a thin piezoelectric film.
Figure 8B:
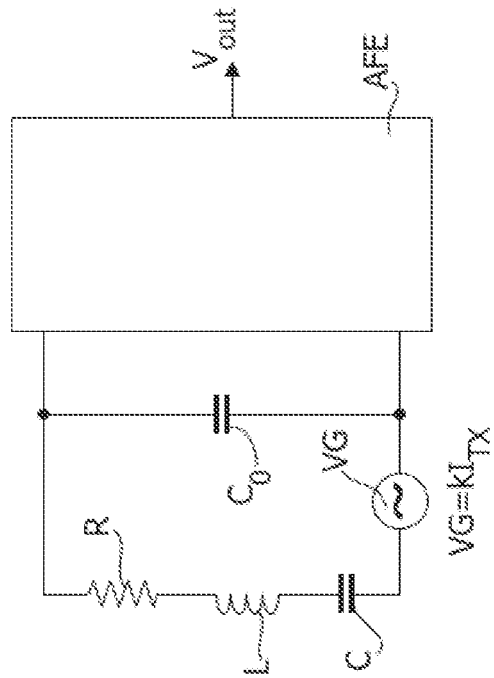
Figure 8A:
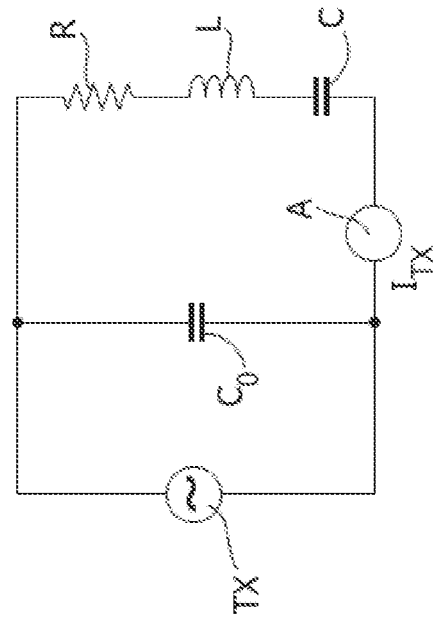

As an alternative or in addition to obtaining a desired resonance frequency, the ability of identifying the resonance frequency (and other operation parameters such as damping parameters like the decay time constant $\tau$, for instance) may be exploited as schematically represented in FIGS. 8A and 8B (substantially similar to FIGS. 6A and 6B, but here considered in possible combination) in order to generate—in real time—a desired expected shape for a reference signal RE (a reference echo as exemplified in FIG. 1, for instance).

FIGS. 8A and 8B are exemplary of a case applicable to an arrangement as exemplified in FIG. 1 where, once the BVD model parameters are known (for the transmitter at 10 and for the receiver at 20) an expected echo shape RE can be calculated, for instance with numerical integration.

For instance, as a function of a (known) excitation signal TX (see also FIG. 1), based on the knowledge of the parameters of the BVD model ($C_0$, R, L, C—see FIG. 6A or 8A, for instance) the expected waveform of the (ultra)sound signal generated by the transmitter transducer can be calculated, as modeled by the current $I_{TX}$ of the current generator A of FIG. 8A.

This will permit to determine the expected waveform of the (ultra)sound signal received at the receiver 20, for instance due to reflection against an obstacle.

The expected waveform of the (ultra)sound signal received at the receiver 20, may then be applied as $V=kI_{TX}$ to the (current controlled) voltage generator VG of FIG. 8B, so that an expected echo waveform can be computed as a (normalized) output voltage Vout from the analog front end AFE of the receiver. Here again, the receiver transducer can be represented as a BVD model with constant k being able to be whatever insofar as the output $V_{out}$ is normalized.

Taking into account the analog front end AFE is helpful insofar as the analog front end (a trans-impedance amplifier with a low-pass filter can be considered as a non-limiting example) may have an impact on the output waveform.

To sum up:

FIG. 8A is exemplary of the possibility of relying on a BVD model (see FIG. 6A) to calculate—based on elementary filter theory, with calculations suited to be performed on-the-fly in a signal processing unit such as 1004 in FIG. 19—a transfer function/impulse response linking $I_{TX}$ to the signal TX, FIG. 8B is exemplary of the possibility of relying again on BVD model (see FIG. 6B) to calculate—based on elementary filter theory, with calculations suited to be performed on-the-fly in a signal processing unit such as 1004 in FIG. 19) a transfer function/impulse response linking $V_{out}$ (thus possibly taking into account the effect of the analog front end AFE) to VG, namely $VG=kI_{TX}$.

Considering FIGS. 8A and 8B in combination, under the assumption that an (ultra)sound signal transmitted from a transducer as modeled in FIG. 8A is received (after reflection at an obstacle, for instance) from a transducer as modeled in FIG. 8B, the possibility exists of calculating a transfer function/impulse response linking $V_{out}$ to the signal TX thus "synthesizing" (based on the waveform of the signal TX: square wave, chirp, and so on) a reference signal such as a reference echo RE for use in cross-correlation (matched filtering) at 40 in FIG. 1.

Such synthesis may involve calculations (e.g., numerical integration of the BVD model) suited to be performed on-the-fly (that is in real time) in a processing unit.

Figure 9A:
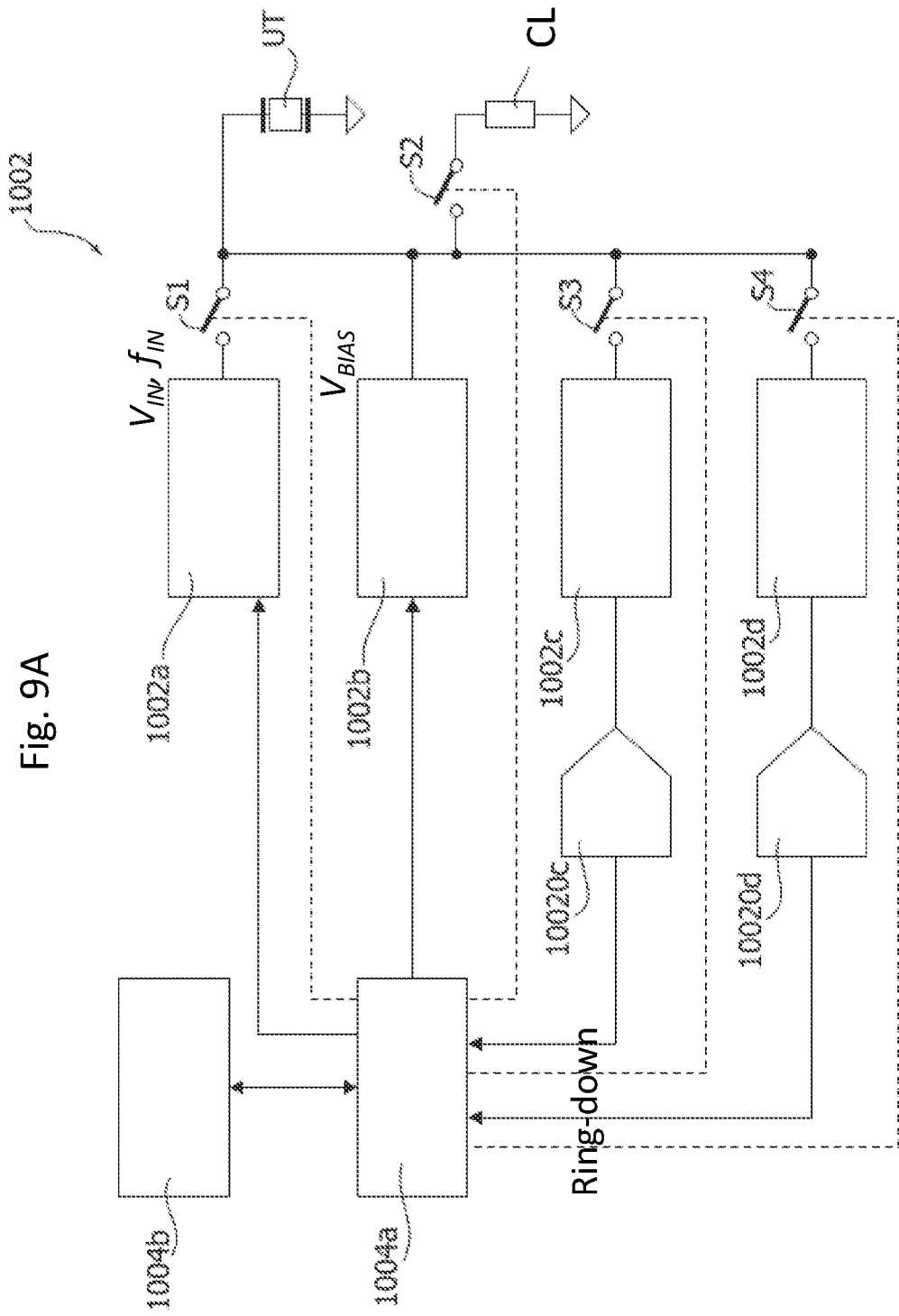
FIG. 9A is illustrative of a circuit driving the transducer according to embodiments.

The diagram of FIG. 9A refers to a hardware architecture intended for use with a single transducer UT (and intended to be replicated for every transducer in a system), although in variant embodiments architecture with plural transducers, a transmitter transducer TX UT and a receiver transducer RX UT, for instance, are possible.

In FIG. 9A references 1004a and 1004b denote a controller circuit and a memory circuit, respectively, which, in one or more embodiments, may be included and/or associated with the processing unit (MCU, for instance) 1004 in FIG. 19.

Similarly, the elements exemplified by blocks 1002a to 1002d as well as by blocks 10020c, 10020d are exemplary of circuitry adapted to be included in the analogue portion 1002 exemplified in FIG. 19.

In FIG. 9A reference 1002a denotes AC voltage generators (for instance pulse generator of the AC-coupled type) adapted to apply electric pulses to the transducer(s) UT or TX UT, RX UT both for transmission pulse generation (see block 10 in FIG. 1B) when coupled to the transducer(s) via switches such as S1. Their output is an input voltage $V_{IN}$, with an amplitude $A_{IN}$ and input frequency $f_{IN}$.

In one or more embodiments as exemplified herein, both the generator(s) 1002a and the switch S1, are configured to operate under the control of the controller 1004a.

Reference 1002b in FIG. 9A denote DC voltage generators (DC coupled) configured to apply to the transducer(s)

UT or TX UT, RX UT DC bias, such as, for instance the (control) bias voltage $V_{BIAS}$ of FIG. 7.

In FIG. 9A reference 1002c denotes an amplifier/buffer adapted to be coupled to the transducer UT (or a respective one of the transducers TX UT, RX UT) via a switch S3 operating under the control of the controller 1004a.

Figure 10:
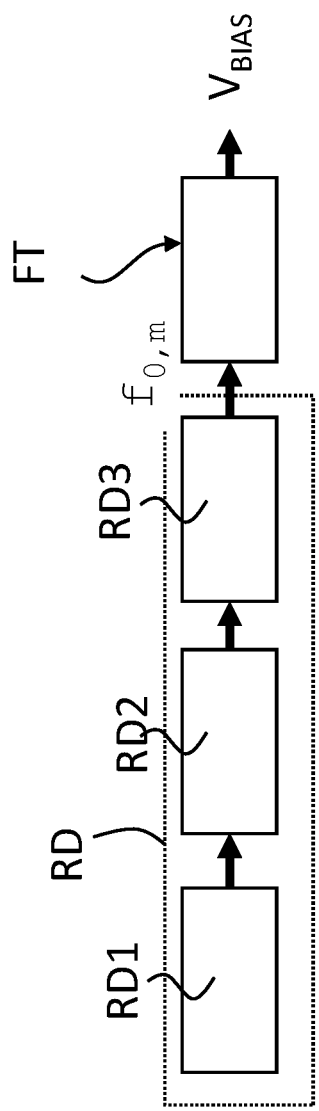
FIG. 10 is exemplary of procedures used within operations of the method according to embodiments.

Reference 10020c denotes an analogue-to-digital converter (ADC) configured to convert to the digital domain a signal as produced by the amplifier 1002c during ring-down acquisition (see the right-hand side of FIG. 2 or operation FT in FIG. 10) and block FT in FIG. 10.

Reference 1002d denotes another amplifier (a trans-impedance amplifier, for instance) configured to be selectively coupled to the transducer UT or RX UT during acquisition of the received signal (see block 20 in FIG. 1 and block RD3 in FIG. 10 described in the following).

Reference 10020d denotes an analogue-to-digital converter (ADC) configured to convert to the digital domain a signal as produced by the amplifier 1002d (which is configured to be coupled to the transducer(s) UT (FIG. 14A) or RX UT (FIGS. 14B and 14C) via a switch S4 controlled by the controller 1004a.

Finally, reference CL in FIG. 9A denotes an (optional) clamp load configured to be coupled to the transmitter transducer(s) via a switch S2 controlled by the controller 1004a during measurement in order to facilitate quick dampening of transducer oscillations. The value for the clamp load CL may be selected as an impedance value which facilitates transfer of energy from the transducer to the load CL. For instance CL may be a resistor with a value equal to the modulus of the impedance for $C_0$ in FIG. 8A.

The following Table is exemplary of possible criteria which may be adopted in the controller 1004a (configured to be programmed for that purpose) to control the switches S1 to S4 in possible embodiments.

In the following table, "closed" denotes a switch (S1 to S4) made electrically-conductive while "open" denotes a switch which is brought to a non-conductive condition.

|  | S1 | S2 | S3 | S4 |
|---|---|---|---|---|
| Excitation. | Closed | Open | Open | Open |
| TX clamp | Open | Closed | Open | Open |
| Ring-down acquisition | Open | Open | Closed | Open |
| RX acquisition | Open | Open | Open | Closed |

The table above refers explicitly to the arrangement of FIG. 9A, which is a more general architecture, adapted to be replicated for every transducer UT in a system.

It will be appreciated that arrangements as exemplified in FIG. 9A involve a DC bias (that is 1002b) always connected.

It will be similarly appreciated that, in one or more embodiments, the switches shown may not be actual, "physical" switches (MOSFET transistors, for instance). In one or more embodiments, the switches shown may be implemented with series impedances, for instance.

Figure 9B:
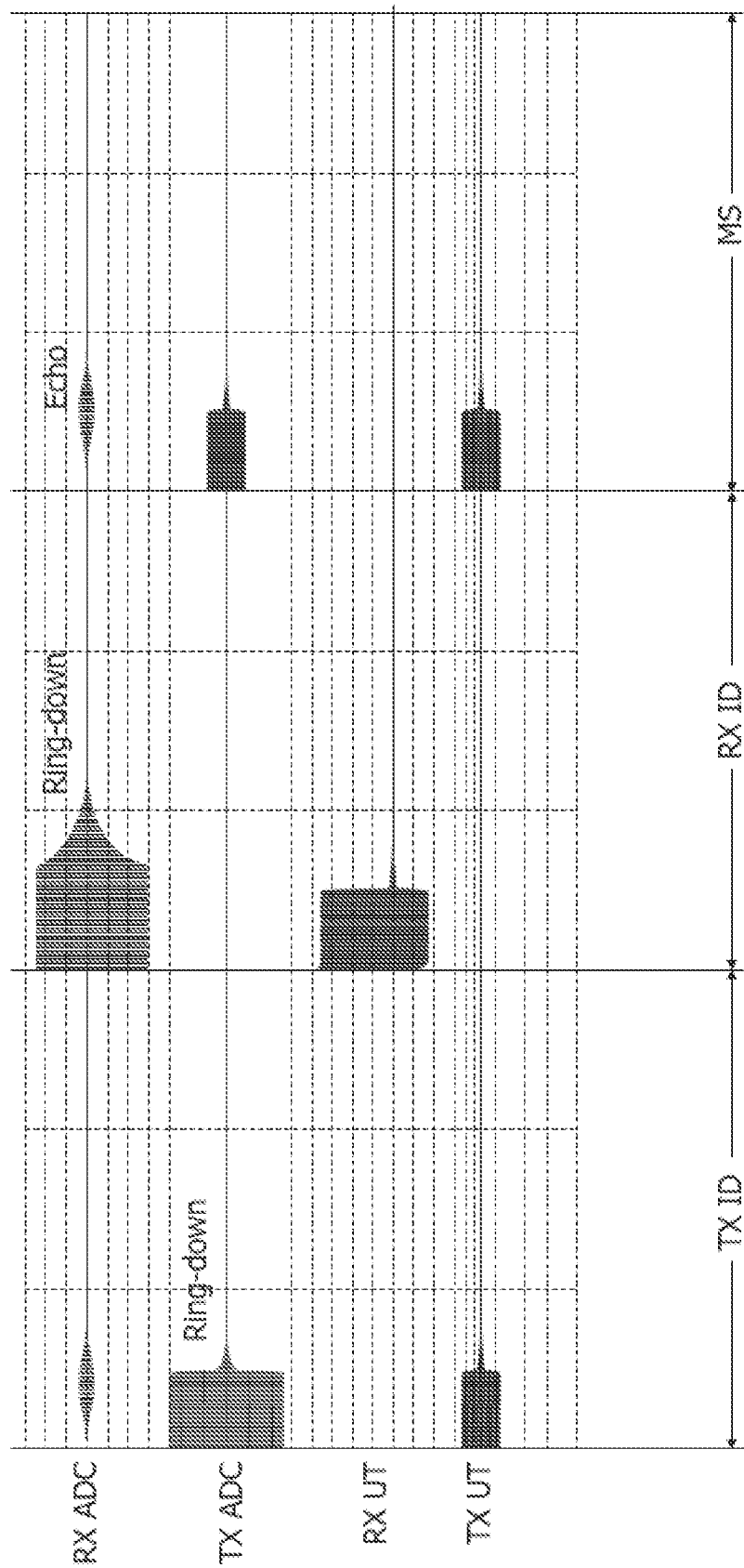
FIG. 9B shows a time diagram of signals issued by the circuit of FIG. 9A.

FIG. 9B is an exemplary representation against a common time scale t of transmitter identification TX ID, receiver identification RX ID and measurement MS phases with exemplary representation of activation of:
RX ADC and TX ADC,
receiver and transmitter transducers RX/UT and TX/UT, with ring down and echo RE generation expressly indicated.

In FIG. 10 it is described a diagram exemplary of procedures which, as illustrated in the following are used within operations of the method here described, in particular the diagram is exemplary of an operation RD performed by a control unit of the system to find an oscillation frequency $f_{0,m}$, i.e., the natural frequency of the membrane 1010, on the basis of a ringdown signal and of an operation FT of frequency tuning.

Operation RD to find the natural frequency includes first applying pulse excitation RD1 to the transducer, receiver or transmitter, followed by ring-down acquisition RD2 for the excited sensor, i.e., the membrane as receiver or transmitter. The results of ring-down acquisition RD2 can thus be exploited (as discussed previously) for identifying RD3 transducer parameters such as the oscillation frequency $f_0$ and also the decay constant τ. The sequence of operations RD1, RD2, RD3 of FIG. 10 as mentioned represents the operations to measure the natural frequency $f_0$ of a membrane 1010.

In FIG. 10 is represented also the frequency tuning operation FT which may be then performed on the transducer, receiver or transmitter or same transducer operating as transmitter and receiver, using as set point the frequency $f_{0,ref}$. In FIG. 10 the measured oscillation frequency $f_{0,m}$ is shown as provided by the operation RD on the basis of the ringdown signal. Frequency tuning FT performs the closed control loop shown with reference to FIG. 7, using the measured oscillation frequency $f_{0,m}$ from operation RD in order to have the measured frequency $f_{0,m}$ converge to the value of the set point $f_{0,ref}$. Thus, the frequency tuning FT is exemplary of an operation which includes performing a number of iterations of the loop of FIG. 7 (blocks CN, RG, BG, UT) to have the measured frequency $f_{0,m}$ converge to the value of the set point frequency $f_{0,ref}$, the loop also controlling and determining consequently the value of the bias voltage $V_{BIAS}$.

Figure 11:
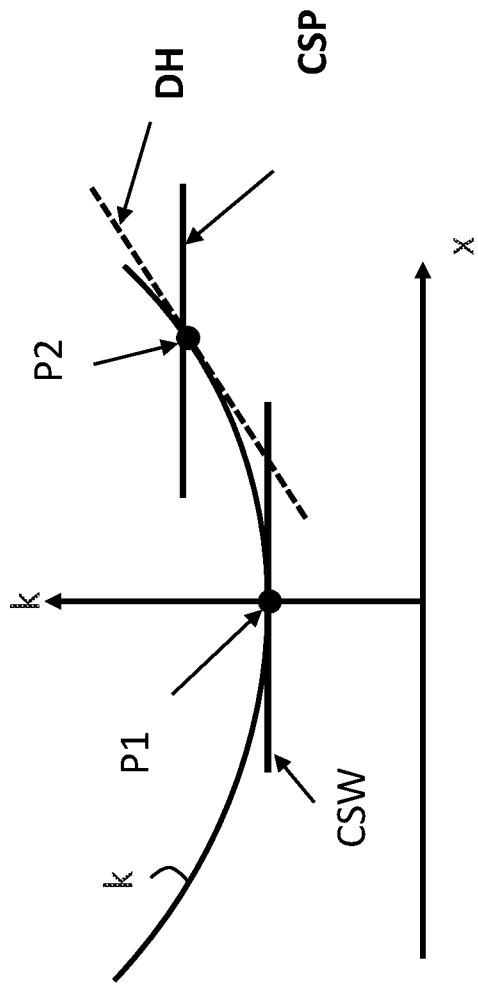
FIG. 11 is a diagram exemplary of possible behavior of an electro-acoustical transducer, according to embodiments.

In FIG. 11 it is shown a diagram representing the modal stiffness k of the membrane 1010 and of the piezoelectric 1020 together as a function of its displacement x from a rest position. The curve shows that the modal stiffness k is a non-linear function of the displacement x, while a rest position without stress P1 is indicated (displacement x=0), where a constant stiffness is indicated for a linear model. Also, a rest position with prestress P2 is indicated for a value of displacement greater than zero, where also a constant stiffness is indicated for a linear model, with pre-stress. The tangent of the non-linear curve of modal stiffness k in the rest position with prestress P2 may be calculated by an approximation with Duffing-Helmholtz equation (quadratic term). It is here specified that the position is not actually without stress, the pre-stress cannot be removed, but the pre-stress may be somehow counterbalanced by the static force induced by the piezoelectric material. Thus, in the following it will be referred as position with balanced pre-stress.

The modal stiffness k is represented as a function of the displacement x by writing the Taylor series and keeping the first two terms. When this non-constant stiffness k is included in the harmonic oscillator equation that describes the fundamental vibrating mode, it is obtained the quadratic Duffing-Helmholtz equation.

To this regard, considering the fundamental vibrating mode, the stiffness k as function of displacement x is modeled with the Duffing-Helmholtz equation, which is a modified harmonic oscillator:

$$a\ddot{x}+b\dot{x}+c(x)x=F(t)$$

where x is a variable standing for the displacement, F(t) is a driving force varying in time, for instance as a cosine law. Parameter b represents the damping and c(x) the stiffness.

The stiffness term c(x) is represented as a function of the displacement by writing the Taylor series and keeping the first three terms, $c_0$, $c_1$, $c_2$.

$$a\ddot{x}+b\dot{x}+(c_0+c_1x+c_2x^2+c_3x^3+\ldots)x=F(t)$$

In the electrical equivalent model, this equation is represented by the dynamical branch (RLC branch), where the capacitance C is not constant, but depends on accumulated charge.

$$L\frac{\partial^2 Q}{\partial t^2} + R\frac{\partial Q}{\partial t} + \frac{1}{C}(1+\beta Q + \gamma Q^2)Q = 0$$

In the electrical equivalent model, the capacitances C of the RLC branch for the transmitter and the receiver are not constant, but function of accumulated charge Q.

Therefore in the equation above, Q represents the charge, while $\gamma$ indicates the second order term or coefficient of the electric equivalent of the stiffness term c(x), i.e., corresponding to coefficient $c_2$ in the Duffing-Helmholtz equation with c(x) expanded with Taylor series keeping the first three terms, $c_0$, $c_1$, $c_2$, $\beta$ is the first order term, indicated in the following as non-linear parameter, corresponding to coefficient $c_1$ in the Duffing-Helmholtz equation with c(x) expanded with Taylor series keeping the first three terms, $c_0$, $c_1$, $c_2$.

In FIG. 12 it is shown then a diagram where it is represented the displacement x of the membrane 1010 of the transmitter as a function of the input frequency $f_{IN}$ of the transmitter. Several curves are shown each corresponding to a different value of input amplitude $A_{IN}$ of the input voltage $V_{IN,TX}$. The arrow indicates increasing values of input amplitude $A_{IN}$, from 0.1 to 3.0 Vpp. With LD is indicated an operating point where system is operated at large displacement x values as it was linear, it still works, but with reduced accuracy. With NLD is indicated an operating point with non-linear operation with a much higher power output.

It is noted that the y-axis labels in FIG. 12 although indicated in the range of $10^{-10}$, are indeed arbitrary units, which are indeed ideally proportional to the actual displacement, but the quantitative measure of the displacement is generally not possible with this type of piezoelectric system. The system is designed such that a measured electrical signal (ringdown) is proportional to the displacement, but with unknown coefficient of proportionality, since the mechanical domain is "seen" through the electrical-mechanical coupling performed by the piezoelectric material. This applies to all the references to "displacement x" throughout the description where it is a measure done by the system, in particular FIGS. 12, 15B, 15C.

The method here described basically considers that in the linear system (small displacements) the optimal operating point is at resonance. It is desirable to increase the TX output power as much as possible, which includes large displacements at which the TX transducer is no more linear, while the RX transducer remains linear (always small displacements). Thus, if the system is operated at large displacements as it was linear (point LD), it still works, but with reduced accuracy. However, there is another operating mode where the TX output power PTX is much higher, in the region of non-linear operating point NLD. Moreover, if a proper non-linear model is used for reference echo prediction, accuracy is improved.

Figure 1B:
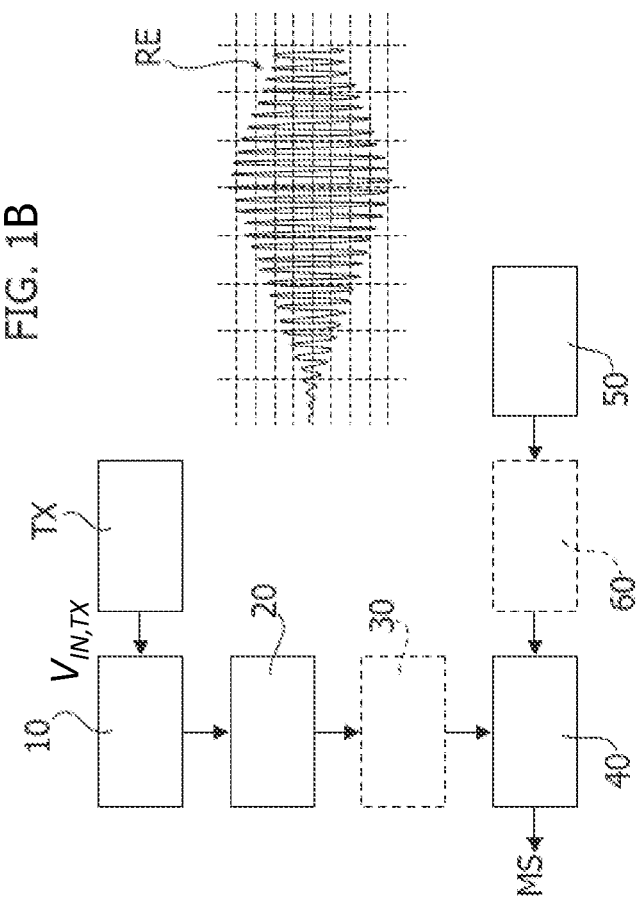
FIG. 1B is a functional diagram is an example of ultrasound-based obstacle detection and ranging.
Figure 13:
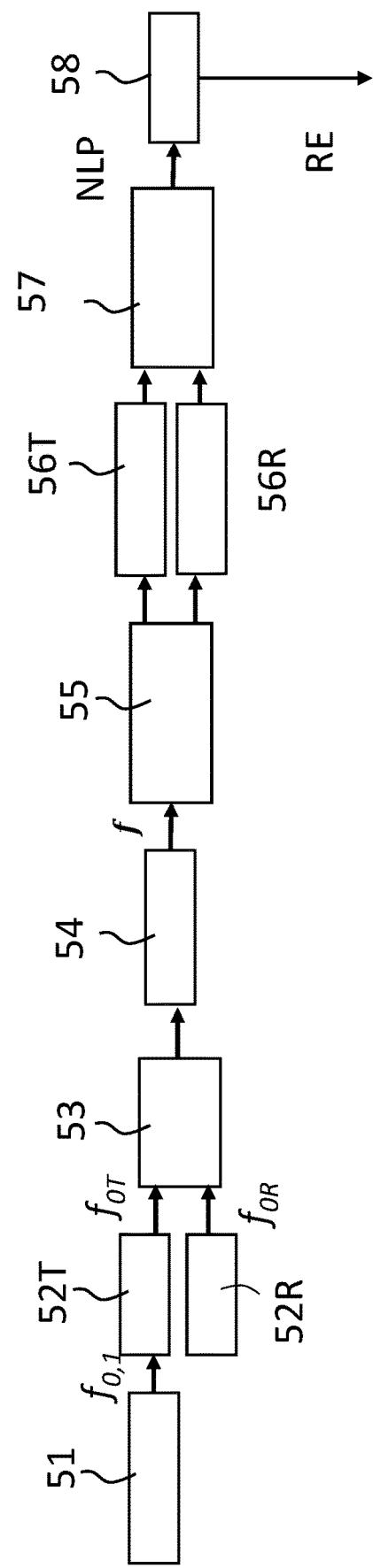
FIG. 13 is a flowchart illustrating operations of the method here described according to embodiments.

On the basis of the above, in FIG. 13 it is shown a flow diagram describing an embodiment of the operation of generation of a reference echo RE 50 of FIG. 1B, which comprises the following operations:

an operation 51 of sweeping the value of the bias voltage of the transmitter $V_{BIAS,TX}$ (see FIG. 7) finding a minimum value of the oscillation frequency, indicated with $f_{0,1}$, as better explained in the following;

finding 52T an oscillation frequency $f_{OT}$ of the transmitter on the basis of a transmitter ringdown signal, using for instance operation RD of FIG. 10, finding 52R an oscillation frequency $f_{OR}$ of the receiver on the basis of a receiver ringdown signal using for instance operation RD of FIG. 10, performing 53 a frequency tuning respectively on the transmitter and the receiver on the basis of said respective oscillation frequencies $f_{OR}$, $f_{OT}$, using for instance operation FT described with reference to FIG. 10, then sweeping 54 an input frequency $f_{IN,TX}$ of the transmitter to find a frequency $\hat{f}$ of the maximum displacement x amplitude in the transmitter ringdown signal, using for instance operation RD multiple times, which usually corresponds to a jump in displacement amplitude, performing 55 a frequency tuning, using operation FT of FIG. 10, of the receiver at said frequency $\hat{f}$ of the maximum displacement x amplitude in the transmitter ringdown signal, performing 56T, 56R the identification of the parameters of the transmitter and the receiver, in particular BVD parameters, performing 57 an identification of non-linear parameters NLP of the transmitter, for instance the non-linear parameter $\beta$, predicting 58 said reference echo RE on the basis of said identified non-linear parameters NLP.

The reference echo RE is indeed the output of the last block, however the procedure in FIG. 13 also finds the optimal operating point $\hat{f}$ and sets up the system to work at that operating point $\hat{f}$.

Figure 14A:
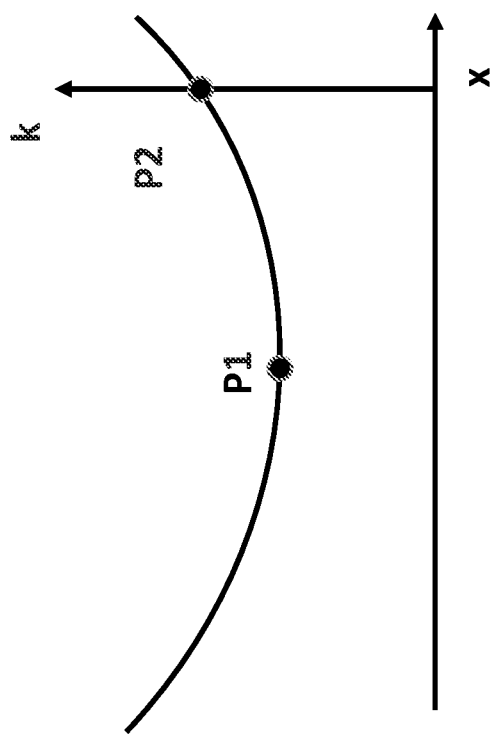
FIGS. 14A, 14B are exemplary of a first operation of the method according to embodiments.
Figure 14B:
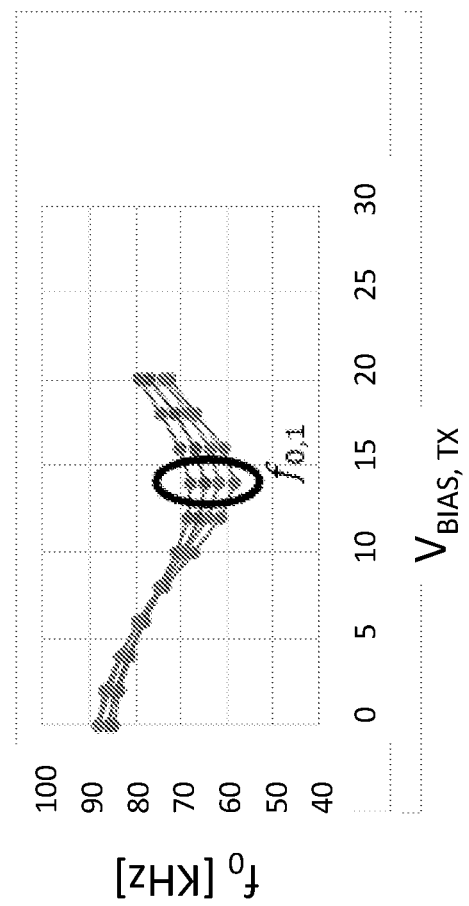

With reference to FIG. 14A, showing the points P1 and P2 on the stiffness curve k as a function of displacement x, and to FIG. 14B showing the resonance frequency $f_0$ as a function of the amplitude of the voltage bias $V_{IN,TX}$, it is here detailed the operation 51 of sweeping the value of the bias voltage of the transmitter $V_{BIAS,TX}$, finding a minimum value of the oscillation frequency $f_{0,1}$.

As better detailed below, the parameter $\gamma$ in the Duffing-Helmholtz equation can be written as function of the non-linear parameter $\beta$, to reduce the complexity of identification of non-linear parameters, from two to one:

$$L\frac{\partial^2 Q}{\partial t^2} + R\frac{\partial Q}{\partial t} + \frac{1}{C}(1+\beta Q + \gamma Q^2)Q \rightarrow$$

$$L\frac{\partial^2 Q}{\partial t^2} + R\frac{\partial Q}{\partial t} + \frac{1}{C}(1+\beta Q + f(\beta)Q^2)Q$$

Considering the two different operating points P1 and P2, related to two different values of bias voltage of the transmitter $V_{BIAS,TX}$, at point P1 the stiffness k vs. displacement x function is symmetric. This is the operating point where the membrane 1010 is flat, while at point P2, with a stress applied, the stiffness k is no longer symmetric with respect to point 2.

In the two points P1 and P2 there is different modal stiffness $k_1$, $k_2$ and different resonance frequency $f_{0,1}$, $f_{0,2}$, but the same modal mass, $m_1=m_2$, which is not affected the by bias voltage of the transmitter $V_{BIAS,TX}$ and internal stresses. Therefore, the resonance frequencies $f_{0,1}$, $f_{0,2}$ in the two points P1 and P2 are:

$$f_{0,1} = \frac{1}{2\pi}\sqrt{\frac{k_1}{m_1}}$$
$$f_{0,2} = \frac{1}{2\pi}\sqrt{\frac{k_2}{m_2}} \rightarrow k_1 = k_2\left(\frac{f_{0,1}}{f_{0,2}}\right)^2$$

i.e., the modal stiffness $k_1$ in point P1 is equal to the modal stiffness $k_2$ in point 2 multiplied by the square of the ratio of the resonance frequencies $f_{0,1}$, $f_{0,2}$.

In the parabola $k(x)$ representing the modal stiffness, $k(x)=k_2(1+\beta x+\gamma x^2)$, $k_1$ is also the vertex of the parabola.

Considering that, in a function $y(x)=ax^2+bx+c$, the ordinate of the vertex of the parabola is $$y_V = \frac{4ac - b^2}{4a},$$

by equating the two formulations of $k_1$, $\gamma$ can be written as a function of the non-linear parameter $\beta$, with frequencies $f_{0,1}$ and $f_{0,2}$ which are two parameters:

$$\gamma = f(\beta) = \frac{\beta^2}{4}\frac{1}{1-\left(\frac{f_{0,1}}{f_{0,2}}\right)^2}$$

$f_{0,2}$ is the resonance frequency in operating point P2, and it can be measured from the ringdown, using operation RD exemplified in FIG. 10;

$f_{0,1}$ is the resonance frequency in operating point P1 and can be measured by sweeping $V_{BIAS,TX}$ and finding the minimum resonance frequency, as shown in FIG. 14B.

Steps 52R for the receiver and 52T for the transmitter are each performed using the steps RD1, RD2, RD3 to find respective oscillation frequencies $f_{OR}$, $f_{OT}$ and time decay values $\tau_R$, $\tau_T$.

Then tuning 53 operates according to the tuning operation FT described in FIG. 10 and FIG. 7 above using the oscillation frequency of the receiver $f_{OR}$ as setpoint frequency for the loop.

Steps 52T and 52R represent measuring steps of the natural frequency of the transmitter and receiver membranes at bias voltage $V_{BIAS}=0V$. This is before the tuning 53 because:

$f_{OR}$, $f_{OT}$ are not a-priori known, and it could be $f_{OT}>f_{OR}$ or $f_{OT}<f_{OR}$. This is because of manufacturing tolerances;

the natural frequency at bias voltage $V_{BIAS}=0V$ cannot be increased; but can be decreased (as shown in FIG. 14B);

Therefore, during the tuning operation 53, the control unit of the system chooses the setpoint frequencies for the tuning loops (i.e., $f_{0,ref}$ in FIG. 7), based on values of oscillation frequencies $f_{OR}$, $f_{OT}$.

Operation 53 represents the frequency tuning of the receiver and/or transmitter membrane: frequency tuning is performed on one of them (more generally, on both of them) in order to have them resonating at the same natural frequency. This is before performing operation 54.

Thus, operation 53 includes performing a frequency tuning FT respectively on the transmitter and the receiver on the basis of said respective oscillation frequencies $f_{OR}$, $f_{OT}$, this in particular comprising supplying said respective oscillation frequencies $f_{OR}$, $f_{OT}$ to a corresponding loop, e.g., CN, RG, BG, MU of FIG. 7, updating a regulation block RG, which in its turn updates a bias generator BG.

In FIG. 15A it is shown then a flow diagram of the operations 54 and 55. FIGS. 15B and 15C show diagram representing displacement x as a function of the input frequency $f_{IN,TX}$, at a maximum value of amplitude of the input voltage, in the example 3.0 VPP, in the case of starting from point P1 (no-prestress) and point P2 (prestressed membrane) respectively.

Operation 54 includes therefore a step 541 of setting the amplitude of the input voltage $V_{IN}$ at a maximum value $A_{INmax}$, e.g., 3.0 VPP. Subsequently, in a step 542 it is performed sweeping the input frequency of the transmitted $f_{IN,TX}$ around linear resonance, indicated by LR in FIGS. 15B, 15C. At each frequency point it is measured the ring-down amplitude, in terms of displacement x, thus obtaining a values x ($f_{IN,TX}$), such as those shown in FIGS. 15B, 15C.

Then in a step 543 it is found a frequency estimate $\hat{f}$ when the ringdown amplitude values x ($f_{IN,TX}$) is maximum (usually close to a «jump» in amplitude, as shown in FIGS. 15B, 15C).

Then, the step of performing 55 a frequency tuning on the receiver corresponding to operation FT, using at such frequency estimate $\hat{f}$ as setpoint frequency $f_{0,ref}$ as exemplified in FIG. 7 with a corresponding update regulation and an update of bias generator.

Thus, the sequence RD1, RD2, RD3 in operation RD represents the operations to measure the natural frequency of a membrane 1010. Each time the natural frequency is measured by using the ringdown, a control unit of the system performs this sequence, e.g., in 52T, 52R, and within operations 51, 53, 54, 55 (and MU).

In the same way, frequency tuning operations such as in operations 53 and 56 are performed comprising tuning operation FT according to FIG. 10 exploiting the loop of FIG. 7. Operations RD, FT are in general applied a single membrane, regardless its usage as transmitter or receiver. As mentioned, the transducer may have a single membranate, operating for transmission and reception.

Performing 56T, 56R the identification of the parameters of the transmitter and the receiver, in particular as BVD parameters is already described with reference to FIGS. 3 and 4. As discussed, the BVD model (Butterworth-Van Dyke model), i.e., a capacitor $C_0$ arranged in parallel with a RLC branch comprising the series of a resistor R, an inductor L and another capacitor C, can be obtained by the following relationships:

$$f_0 = (1/2\pi)(L/[C_0 C/(C_0+C)])^{1/2}$$

$$\tau = 2(L/R)$$

such parameters $f_0$, $\tau$ being obtained measuring the ringdown for the receiver and the transmitter. Each time the bias voltage $V_{BIAS}$ is changed (e.g., when frequency tuning is performed), the correspondent BVD model is different, since the voltage $V_{BIAS}$ changes the degree of electrical-mechanical coupling in the piezoelectric material. Therefore, the computation of the ringdown, $f_0$, $\tau$ is repeated each time the operations 56T, 56R are carried out.

Then operations 57 of identification of the non-linear parameter $\beta$ is detailed in the flow diagram of FIG. 16, and may be performed using an ad-hoc Neural Network, and includes first exciting 571 with a high voltage, corresponding to the non-linear operation zone, at the oscillation frequency and acquire the corresponding ring down (using for instance operation RD), then computing 572 the period T from the ring down, then feeding 573 a trained neural network with the period curve T(t), R, L, C and initial value of the ringdown IC, finally computing 574 the non-linear parameter β with the trained neural network.

As mentioned the non-linear parameter is the first order coefficient in the electrical equivalent model of the Duffing Helmholtz equation, represented by the dynamical branch (RLC branch), where the capacitance C is not constant, but depends on accumulated charge.

$$L\frac{\partial^2 Q}{\partial t^2} + R\frac{\partial Q}{\partial t} + \frac{1}{C}(1 + \beta Q + \gamma Q^2)Q = 0$$

The non-linear parameter β is the first order term of the electrical equivalent of stiffness c(x), i.e., corresponding to coefficient $c_1$ in the Duffing-Helmholtz equation with c(x) expanded with Taylor series keeping the first three terms, $c_0$, $c_1$, $c_2$. Also second order parameter γ may be comprised in the non-linear parameter determined by the operation 57.

In FIG. 16 are also shown the operation 575, 576 of a training procedure of the neural network, which of course is performed once offline, not during the normal operation of the transducer. With 575 is indicated the generation of an artificial data set, with 576 the training of the neural network with such dataset.

Generation of an artificial data set 575, i.e., a training data set, is performed by numerical integration of the Duffing model equation, with a choice of the parameters in accordance with the measurements. It is then trained 576 the ad-hoc Neural Network AHN that takes period curves T(t) and differential equation parameters as input and gives the predicted non-linear parameter β. Then, the so trained network is used for computing 574 non-linear parameter β with the trained neural network Trained on an artificial dataset generated from the numerical integration of the model equation avoids having to collect a labelled dataset that would be impossible to obtain in this particular scenario, as the parameter β is always unknown. The main advantage of this approach is that the networks are capable to learn a more general identification function that could be applied to different membranes and spare the time to obtain a large number of acquisitions.

It is here indicated an ad-hoc network AHN with hybrid architecture. Hybrid networks have branches that take as input different data type, process them separately and then concatenate them together to produce the output. In this way we can process all the relevant features of the device together despite their format.

The first branch of the network AHN accepts as input the numerical parameters and processes them with few fully connected layers, while the other branch processes the period curve with a DNN (e.g., CNN or RNN). The outputs of the two branches are subsequently concatenated and processed with other fully connected layers. At this point the target β is computed.

In FIG. 17 it is shown the trained neural network AHN, an ad-hoc network with hybrid architecture. Hybrid networks have branches that take as input different data type, process them separately and then concatenate them together to produce the output. In this it is possible to process all the relevant features of the device together despite their format.

A first branch FB of the network AHN accepts as input the numerical parameters R, L, C and IC and processes them with few fully connected layers in a feed forward neural network FFN indicated with F, while another other branch DB processes the period curve T(−t) with a deep neural network DNN (e.g., convoluted neural network CNN or recurrent neural network RNN) indicated with D. The outputs of the two branches are subsequently concatenated in a concatenate block CT and processed with other fully connected layers F2. At this point the target non-linear parameter β is computed.

With reference to FIG. 18 where the neural network AHN is shown with reference to the training phase or procedure, information as described with reference to FIG. 15 is forward (F1) in the first branch F (FFN layers) and respective information (e.g., T(t)) is forward (F2) in the second branch D (DNN layers). The outputs of the two branches are merged in concatenation layers CT and information is forward (F3) processed with FFN layers F2. At the target, the resulting non-linear parameter β is computed and a mean squared error loss function is computed, then parameters are updated in the three branches (backwards information BK1, BK2, BK3.

Finally the operation of prediction 58 of the reference echo is performed, using a TX-RX chain model based on modified Butterworth-Van-Dyke model, including non-constant stiffness, i.e., non-linear parameter β, determining a BVD model for a transmitter transducer and a receiver transducer (starting from reference parameters $f_{0,TX}$, $\tau_{TX}$ and $f_{0,RX}$, $\tau_{RX}$ for a transmitter transducer and a receiver transducer, respectively). Model parameters are computed from ring-down waveform, in previous steps Then, the waveform of expected received echo RE is synthesized, in particular computed by numerical integration of the whole TX-RX chain, along the lines indicated in FIGS. 8A, 8B, providing the reference RE as an output.

In variant embodiments, non-linear parameters may not be considered, i.e., Reference Echo Prediction 58 is made using linear model. Thus steps 51 and 57 are not performed.

In other variant embodiments, no model identification may be performed, using nominal waveform for Cross-Correlation 40. Thus steps 51 and 56-58 are not performed.

In further variant embodiments, no minimum $f_{0,1}$ measure is performed and nominal value used for $$\gamma = f(\beta) = K\frac{\beta^2}{4},$$

K ∈ (1, +∞), for example K=2. In this case step 51 is skipped while step 57 is performed with such nominal value.

In further variant embodiments, given R, L, C, the parameter β in the BVD-Duffing model can be computed with a MSE (Minimum Squared Error) optimization on period curves T(t), instead of using a Neural Network. It is found an optimal parameter value $\beta_{opt}$ such that the MSE between the period of the measurements and of the integrated model with the optimal parameter value $\beta_{opt}$ is small. In a further variant, the parameter β is computed in two steps:
  find parameter β with the Neural Network NN (step 574);
  use such value of parameter β found at previous step as starting point for MSE Optimization as described above.

FIG. 19 is exemplary of a circuit/system architecture 1000 configured to host (at 1004, for instance) a software procedure capable of performing time-of-flight measurements by means of one or more ultrasonic transducers UT by taking into account (and countering) possible drawbacks related to narrow bandwidth available and/or transducer parameters possibly subject to manufacturing spread and variations over time. This may occur by means of a hardware architecture 1002 suited to connect one or more transducers UT to a DC voltage generator 1002b and (simultaneously) to either one of AC voltage generator (1002a), a trans-impedance amplifier (1002d), an amplifier/buffer (1002c) and a clamp load (L) by avoiding undesired mutually interference.

As exemplified herein, a method of operating a PMUT electro-acoustical transducer, may comprise:

applying over an excitation interval to the transducer an excitation signal which is configured to emit corresponding ultrasound pulses towards a surrounding space, acquiring at a receiver reflected ultrasound pulses as reflected in said surrounding space, generating a reference echo signal performing a cross-correlation of said acquired received ultrasound pulses with said reference echo signal, performing a measurement based on the cross-correlation results, in particular a measurement of the time of flight of the ultrasound pulses, wherein said reference echo is obtained by finding an oscillation frequency of the transmitter on the basis of a transmitter ringdown signal, finding an oscillation frequency of the receiver on the basis of a receiver ringdown signal, performing a frequency tuning respectively on the transmitter and the receiver on the basis of said respective oscillation frequencies, then sweeping an input frequency of the transmitter to find a frequency of the maximum displacement in the ringdown signal, performing a frequency tuning of the receiver at said frequency of the maximum displacement in the ring-down signal of the transmitter.

As exemplified herein, said sweeping an input frequency of the transmitter to find a frequency of the maximum displacement in the ringdown signal includes setting the amplitude of the input voltage at a maximum value, sweeping the input frequency of the transmitter in a linear resonance region, measuring the corresponding ring-down amplitudes, in terms of membrane displacement, finding a frequency (f) of the maximum displacement when the ring-down amplitude values (x) is maximum, performing a frequency tuning of the receiver at said frequency of the maximum displacement in the ring-down signal of the transmitter.

As exemplified herein, the method may further comprise performing the identification of the parameters of the transmitter and the receiver, performing an identification of one or more non-linear parameter of the transmitter, predicting said reference echo RE on the basis of said identified one or more non-linear parameters, As exemplified herein, the method may further comprise sweeping the value of the bias voltage of the transmitter finding a minimum value of the oscillation frequency associated to an operating point with balanced pre-stress and obtaining a resonance frequency associated to an operating point with pre-stress from the transmitter ringdown, performing a parameter reduction in the Duffing Helmholtz equation as a function of said minimum value of the oscillation frequency associated to an operating point with balanced pre-stress and resonance frequency associated to an operating point with pre-stress, As exemplified herein, said steps of finding an oscillation frequency of the transmitter on the basis of a transmitter ringdown signal, finding an oscillation frequency of the receiver on the basis of a receiver ringdown signal, comprise each applying a pulse excitation to the transmitter or receiver followed by a ring-down acquisition, identifying from the acquired ringdown transducer parameters including the oscillation frequency of the transmitter or receiver and also the decay constant of the transmitter or receiver.

As exemplified herein, the method may further comprise performing a frequency tuning respectively on the transmitter and the receiver on the basis of said respective oscillation frequencies, comprises supplying said respective oscillation frequencies to a corresponding loop (CN, RG, BG, MS) updating a regulation block, which is its turn updates a bias generator, As exemplified herein, said performing the identification of the one or more non-linear parameters of the transmitter and the receiver includes performing an identification with a Butterworth-Van Dyke model on the basis of the transducer parameters including the oscillation frequency of the transmitter or receiver and also the decay constant of the transmitter or receiver obtained by finding an oscillation frequency of the transmitter on the basis of a transmitter ringdown signal and finding an oscillation frequency of the receiver on the basis of a receiver ringdown signal.

As exemplified herein, said performing an identification of one or more non-linear parameters of the transmitter, includes exciting with a high voltage, corresponding to the non-linear operation zone, the transmitter at the oscillation frequency and acquire the corresponding ring down, then computing the period from the ring down, then feeding a trained neural network with the period curve, series parameters of the BVD model and an initial value of the ringdown, finally computing the one or more non-linear parameters with the trained neural network.

As exemplified herein, said network may comprise a first branch accepting as input the series parameters of the BVD model and an initial value of the ringdown and processes them with fully connected layers in a feed forward network and a second branch accepting as input the period curve T and processing it with a deep neural network, the outputs of the two branches being subsequently concatenated and processed with a further fully connected layers in a feed forward network, As exemplified herein, a circuit may comprise:

at least one electro-acoustical transducer, exciter circuitry configured to apply to the at least one transducer an excitation signal over an excitation interval, ring-down acquisition circuitry to acquire at the at least one transducer a ring-down signal indicative of the ring-down behavior of the transducer after the end of the excitation interval, signal processing circuitry configured to calculate, as a function of said ring-down signal, a resonance frequency of the at least one electro-acoustical transducer, the circuit configured to operate with the method of any of the previous claims.

As exemplified herein, a device comprising a circuit according to embodiments, the device selected out of:

obstacle detection devices, preferably vehicle-mounted devices, volume measurement devices, gesture recognition devices, flow metering devices, devices relying on time-of-flight measurement of sound waves.

A circuit as exemplified herein may comprise control circuitry (for instance, CN, RG, BG) configured to control a bias voltage of the at least one electro-acoustical transducer as a function of the resonance frequency calculated to bring the resonance frequency of the electro-acoustical transducer to a reference frequency value.

A circuit as exemplified herein may be configured (via a same or different receiver transducer) to transduce an acoustical signal received into an electrical reception signal with said signal processing circuitry configured to calculate, as a function of said ring-down signal, a damping parameter of the electro-acoustical transducer, and synthesize, as a function of the resonance frequency and the damping parameter of the electro-acoustical transducer calculated, a cross-correlation reference signal, A circuit as exemplified herein cross-correlation circuitry (for instance, 40) may be provided to perform cross-correlation of the electrical reception signal and the cross-correlation reference signal.

Thus the method here described allows to obtain an increased range of the time-of-flight measure, in particular thanks to the capability to measure and predict the non-linear response, the transmitter can be driven with increased range, thanks to increased emitted sound pressure, with the same (bounded) voltage of prior art solutions, and the representation of the expected echo is more accurate (increased accuracy).

As to the increased ranges, the maximum driving voltage is bounded by either the driving circuitry (e.g., to keep power consumption/dimension/cost low/small) or the transducer (related to the maximum electric field that piezo material can withstand without damage), thus the method here described allows increasing the output pressure (and therefore the range) despite the bounded input voltage.

As to the increased accuracy, the capability to measure the non-linear parameter (e.g., β), in real-time, leads to increased accuracy, when used in echo synthesis plus cross-correlation. Without prejudice to the underlying principles, the details and the embodiments may vary, even significantly, with respect to what has been described by way of example, without departing from the scope of protection.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    applying, over an excitation interval to a transmitter of an electro-acoustical transducer, an excitation signal that is configured to emit corresponding ultrasound pulses from the transmitter and towards a surrounding space;
    acquiring, at a receiver of the electro-acoustical transducer, reflected ultrasound pulses that are reflected in the surrounding space;
    generating a reference echo signal, the generating of the reference echo signal including:
        determining an oscillation frequency of the transmitter based on a transmitter ringdown signal;
        determining an oscillation frequency of the receiver based on a receiver ringdown signal;
        performing frequency tuning on the transmitter and the receiver based on the oscillation frequency of the transmitter and the oscillation frequency of the receiver, respectively;
        determining a frequency of a maximum displacement in the transmitter ringdown signal by sweeping an input frequency of the transmitter;
        performing a frequency tuning of the receiver at the frequency of the maximum displacement in the transmitter ringdown signal;
        exciting, with a high voltage corresponding to a non-linear operation zone, the transmitter at the oscillation frequency of the transmitter, and acquiring a corresponding ringdown;
        determining a period from the corresponding ringdown;
        feeding a trained neural network with a period curve, series parameters of a Butterworth-Van Dyke (BVD) model, and an initial value of the corresponding ringdown;
        determining one or more non-linear parameters of the transmitter with the trained neural network; and
        predicting the reference echo signal based on the one or more non-linear parameters;
    performing a cross-correlation of the reflected ultrasound pulses with the reference echo signal; and
    performing a measurement based on the cross-correlation, the measurement including a time of flight of the ultrasound pulses.

2. The method of claim 1, wherein the determining of the frequency of the maximum displacement in the transmitter ringdown signal includes setting an amplitude of an input voltage at a maximum value, sweeping the input frequency of the transmitter in a linear resonance region, measuring corresponding ringdown amplitudes in terms of membrane displacement, and determining the frequency of the maximum displacement in a case where values of the ringdown amplitudes is maximum.

3. The method of claim 1, further comprising:
    performing an identification of parameters of the transmitter and the receiver.

4. The method of claim 1, further comprising:
    sweeping a value of a bias voltage of the transmitter;
    determining a minimum value of the oscillation frequency associated to an operating point with balanced pre-stress;
    obtaining a resonance frequency associated to an operating point with pre-stress from the transmitter ringdown signal; and
    performing a parameter reduction in a Duffing Helmholtz equation as a function of the minimum value of the oscillation frequency associated to the operating point with balanced pre-stress and the resonance frequency associated to the operating point with pre-stress.

5. The method of claim 1, wherein
the determining of the oscillation frequency of the transmitter includes:
    applying a pulse excitation to the transmitter followed by a first ringdown acquisition; and identifying, from the acquired first ringdown, transducer parameters including the oscillation frequency of the transmitter and a decay constant of the transmitter, and the determining of the oscillation frequency of the receiver includes:
applying a pulse excitation to the receiver followed by a second ringdown acquisition; and
identifying, from the acquired second ringdown, transducer parameters including the oscillation frequency of the receiver and a decay constant of the receiver.

6. The method of claim 5 wherein the performing of the frequency tuning on the transmitter and the receiver based on the oscillation frequency of the transmitter and the oscillation frequency of the receiver includes:
supplying the oscillation frequency of the transmitter and the oscillation frequency of the received to a corresponding loop updating a regulation block, which updates a bias generator.

7. The method of claim 5, further comprising:
performing an identification of parameters of the transmitter and the receiver, wherein
the performing of the identification of the parameters of the transmitter includes performing an identification with a Butterworth-Van Dyke (BVD) model based on the transducer parameters including the oscillation frequency of the transmitter and the decay constant of the transmitter obtained by determining the oscillation frequency of the transmitter based on the transmitter ringdown signal, and
the performing of the identification of the parameters of the receiver includes performing an identification with a Butterworth-Van Dyke model based on the transducer parameters including the oscillation frequency of the receiver and the decay constant of the receiver obtained by determining the oscillation frequency of the receiver based on the receiver ringdown signal.

8. The method of claim 1, wherein the trained neural network includes:
a first branch accepting as input the series parameters of the BVD model and an initial value of the corresponding ringdown, and processing the series parameters of the BVD model and the initial value of the corresponding ringdown with fully connected layers in a feed forward network; and
a second branch accepting as input the period curve, and processing the period curve with a deep neural network, outputs of the first and second branches being subsequently concatenated and processed with further fully connected layers in a feed forward network.

9. The method of claim 1, wherein the electro-acoustical transducer is a piezoelectric micromachined ultrasonic transducer.

10. A circuit, comprising:
an electro-acoustical transducer configured to transmit ultrasound pulses, and receive reflected ultrasound pulses;
exciter circuitry configured to apply, to the electro-acoustical transducer, an excitation signal over an excitation interval; and
processing circuitry configured to;
generate a reference echo signal, wherein, for the generation of the reference echo signal,
the exciter circuitry excites, with a high voltage corresponding to a non-linear operation zone, the electro-acoustical transducer at an oscillation frequency of a transmitter of the electro-acoustical transducer, and the processing circuitry acquires a corresponding ringdown,
the processing circuitry determines a period from the corresponding ringdown;
the processing circuitry feeds a trained neural network with a period curve, series parameters of a Butterworth-Van Dyke (BVD) model, and an initial value of the corresponding ringdown;
the processing circuitry determines one or more non-linear parameters of the transmitter with the trained neural network; and
the processing circuitry predicts the reference echo signal based on the one or more non-linear parameters;
perform a cross-correlation of the reflected ultrasound pulses with the reference echo signal; and
perform a measurement based on the cross-correlation, the measurement including a time of flight of the ultrasound pulses.

11. The circuit of claim 10, further comprising:
ringdown acquisition circuitry configured to acquire, from the electro-acoustical transducer, a ringdown signal indicative of a ringdown behavior of the electro-acoustical transducer after an end of the excitation interval,
wherein the processing circuitry is configured to:
calculate, as a function of the ringdown signal, a resonance frequency of the electro-acoustical transducer; and
perform frequency tuning on the electro-acoustical transducer based on the resonance frequency.

12. The circuit of claim 10, further comprising:
ringdown acquisition circuitry configured to acquire, from the electro-acoustical transducer, a ringdown signal indicative of a ringdown behavior of the electro-acoustical transducer after an end of the excitation interval,
wherein the processing circuitry is configured to:
calculate, as a function of the ringdown signal, a resonance frequency of the electro-acoustical transducer; and
determine a frequency of a maximum displacement in the ringdown signal by sweeping an input frequency of the electro-acoustical transducer.

13. The circuit of claim 12, wherein the processing circuitry is configured to:
set an amplitude of an input voltage at a maximum value;
sweep the input frequency of the electro-acoustical transducer in a linear resonance region;
measure corresponding ringdown amplitudes in terms of membrane displacement; and
determine the frequency of the maximum displacement in a case where values of the ringdown amplitudes is maximum.

14. The circuit of claim 10, wherein, for the generation of the reference echo signal,
the processing circuitry determines the oscillation frequency of the transmitter of the electro-acoustical transducer based on a transmitter ringdown signal,
the processing circuitry determines an oscillation frequency of a receiver of the electro-acoustical transducer based on a receiver ringdown signal,
the processing circuitry performs frequency tuning on the transmitter and the receiver based on the oscillation frequency of the transmitter and the oscillation frequency of the receiver, respectively, the processing circuitry determines a frequency of a maximum displacement in the transmitter ringdown signal by sweeping an input frequency of the transmitter, and the processing circuitry performs a frequency tuning of the receiver at the frequency of the maximum displacement in the transmitter ringdown signal.

15. A device comprising:

an electro-acoustical transducer configured to transmit ultrasound pulses, and receive reflected ultrasound pulses;

exciter circuitry configured to apply, to the electro-acoustical transducer, an excitation signal over an excitation interval; and processing circuitry configured to:
- generate a reference echo signal, wherein, for the generation of the reference echo signal,
  - the exciter circuitry excites, with a high voltage corresponding to a non-linear operation zone, the electro-acoustical transducer at an oscillation frequency of a transmitter of the electro-acoustical transducer, and the processing circuitry acquires a corresponding ringdown,
  - the processing circuitry determines a period from the corresponding ringdown;
  - the processing circuitry feeds a trained neural network with a period curve, series parameters of a Butterworth-Van Dyke (BVD) model, and an initial value of the corresponding ringdown;
  - the processing circuitry determines one or more non-linear parameters of the transmitter with the trained neural network; and
  - the processing circuitry predicts the reference echo signal based on the one or more non-linear parameters;
- perform a cross-correlation of the reflected ultrasound pulses with the reference echo signal; and
- perform a measurement based on the cross-correlation, the measurement including a time of flight of the ultrasound pulses, wherein the device is an obstacle detection device, a volume measurement device, a gesture recognition device, a flow metering device, or a device relying on time-of-flight measurements of sound waves.

16. The device of claim 15, further comprising:

ringdown acquisition circuitry configured to acquire, from the electro-acoustical transducer, a ringdown signal indicative of a ringdown behavior of the electro-acoustical transducer after an end of the excitation interval, wherein the processing circuitry is configured to:
- calculate, as a function of the ringdown signal, a resonance frequency of the electro-acoustical transducer; and
- perform frequency tuning on the electro-acoustical transducer based on the resonance frequency.

17. The device of claim 15, wherein the electro-acoustical transducer is a piezoelectric micromachined ultrasonic transducer.

18. The device of claim 15, wherein, for the generation of the reference echo signal, the processing circuitry determines the oscillation frequency of the transmitter of the electro-acoustical transducer based on a transmitter ringdown signal, the processing circuitry determines an oscillation frequency of a receiver of the electro-acoustical transducer based on a receiver ringdown signal, the processing circuitry performs frequency tuning on the transmitter and the receiver based on the oscillation frequency of the transmitter and the oscillation frequency of the receiver, respectively, the processing circuitry determines a frequency of a maximum displacement in the transmitter ringdown signal by sweeping an input frequency of the transmitter, and the processing circuitry performs a frequency tuning of the receiver at the frequency of the maximum displacement in the transmitter ringdown signal.

* * * * *